United States Patent
Srinivasan et al.

(10) Patent No.: US 9,924,224 B2
(45) Date of Patent: Mar. 20, 2018

(54) METHODS AND APPARATUS TO DETERMINE A STATE OF A MEDIA PRESENTATION DEVICE

(71) Applicant: The Nielsen Company (US), LLC, New York, NY (US)

(72) Inventors: Venugopal Srinivasan, Palm Harbor, FL (US); Morris Lee, Palm Harbor, FL (US); Jeremey M. Davis, New Port Richey, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/926,885

(22) Filed: Oct. 29, 2015

(65) Prior Publication Data
US 2016/0295279 A1    Oct. 6, 2016

Related U.S. Application Data

(60) Provisional application No. 62/142,771, filed on Apr. 3, 2015.

(51) Int. Cl.
*H04N 21/442* (2011.01)
*H04N 21/439* (2011.01)
(Continued)

(52) U.S. Cl.
CPC ..... *H04N 21/44213* (2013.01); *G10L 19/018* (2013.01); *G10L 25/51* (2013.01);
(Continued)

(58) Field of Classification Search
CPC ......... H04N 21/42203; H04N 21/4394; H04N 21/44213; H04N 21/6582; H04N 21/8108;
(Continued)

(56) References Cited

U.S. PATENT DOCUMENTS 1,988,621 A  1/1935  Hansell
2,558,754 A  7/1951  Horn et al.
(Continued)

FOREIGN PATENT DOCUMENTS

AU  2006279518  2/2007
CA  2777579  11/2012
(Continued)

OTHER PUBLICATIONS

"American Technology Corporation—Retailer Ads—AM & FM Sounds", [online]. Woody Norris, May 4, 2004 [retrieved on Sep. 29, 2004]. Retrieved from the Internet: <URL: www.woodynorris.com>. (3 pages).

(Continued)

*Primary Examiner* — Hai V Tran
(74) *Attorney, Agent, or Firm* — Hanley, Flight and Zimmerman, LLC

(57) ABSTRACT

Methods and apparatus to determine a state of a media presentation device are disclosed. Example disclosed methods include generating a first set of weighted coefficients based on first audio received by first and second microphones at a first time. Example disclosed methods include generating a second set of weighted coefficients based on second audio received by the first and second microphones at a second time after the first time. Example disclosed methods include comparing the first set of coefficients and the second set of coefficients to generate a similarity value. Example disclosed methods include, when the similarity value satisfies a threshold, determining that the media presentation device is in a first state. Example disclosed methods include, when the similarity value does not satisfy the threshold, determining that the media presentation device is in a second state.

20 Claims, 11 Drawing Sheets

(51) Int. Cl.

| | | |
|---|---|---|
| *H04N 21/422* | (2011.01) | |
| *H04N 21/81* | (2011.01) | |
| *G10L 25/51* | (2013.01) | |
| *H04H 60/37* | (2008.01) | |
| *H04H 60/58* | (2008.01) | |
| *H04H 60/65* | (2008.01) | |
| *G10L 19/018* | (2013.01) | |

(52) U.S. Cl.
CPC ............ *H04H 60/37* (2013.01); *H04H 60/58* (2013.01); *H04H 60/65* (2013.01); *H04N 21/42203* (2013.01); *H04N 21/4394* (2013.01); *H04N 21/8106* (2013.01); *H04H 2201/50* (2013.01); *H04H 2201/90* (2013.01)

(58) Field of Classification Search
CPC . G01R 33/02; G01R 21/133; G06F 17/30743; G06F 9/45533; H04H 60/32; H04H 60/35; H04H 60/58; H04H 60/73; H04L 12/2827
See application file for complete search history.

(56) References Cited

U.S. PATENT DOCUMENTS

| | | |
|---|---|---|
| 2,855,993 A | 10/1958 | Rahmel |
| 2,903,508 A | 9/1959 | Hathaway |
| 3,056,135 A | 9/1962 | Currey et al. |
| 3,142,820 A | 7/1964 | Daniels |
| 3,281,695 A | 10/1966 | Bass |
| 3,315,160 A | 4/1967 | Goodman |
| 3,351,910 A | 11/1967 | Miller |
| 3,483,327 A | 12/1969 | Schwartz |
| 3,633,112 A | 1/1972 | Anderson |
| 3,651,471 A | 3/1972 | Haselwood et al. |
| 3,733,430 A | 5/1973 | Thompson et al. |
| 3,742,359 A | 6/1973 | Behymer |
| 3,803,349 A | 4/1974 | Watanabe |
| 3,906,454 A | 9/1975 | Martin |
| 3,947,624 A | 3/1976 | Miyake |
| 4,027,332 A | 5/1977 | Wu et al. |
| 4,044,376 A | 8/1977 | Porter |
| 4,058,829 A | 11/1977 | Thompson |
| 4,107,734 A | 8/1978 | Percy et al. |
| 4,245,245 A | 1/1981 | Matsumoto et al. |
| 4,382,291 A | 5/1983 | Nakauchi |
| 4,388,644 A | 6/1983 | Ishman et al. |
| 4,546,382 A | 10/1985 | McKenna et al. |
| 4,566,030 A | 1/1986 | Nickerson et al. |
| 4,574,304 A | 3/1986 | Watanabe et al. |
| 4,605,958 A | 8/1986 | Machnik et al. |
| 4,613,904 A | 9/1986 | Lurie |
| 4,622,583 A | 11/1986 | Watanabe et al. |
| 4,626,904 A | 12/1986 | Lurie |
| 4,642,685 A | 2/1987 | Roberts et al. |
| 4,644,393 A | 2/1987 | Smith et al. |
| 4,644,509 A | 2/1987 | Kiewit et al. |
| 4,647,964 A | 3/1987 | Weinblatt |
| 4,652,915 A | 3/1987 | Heller, III |
| 4,695,879 A | 9/1987 | Weinblatt |
| 4,697,209 A | 9/1987 | Kiewit et al. |
| 4,718,106 A | 1/1988 | Weinblatt |
| 4,723,302 A | 2/1988 | Fulmer et al. |
| 4,728,930 A | 3/1988 | Grote et al. |
| 4,764,808 A | 8/1988 | Solar |
| 4,769,697 A | 9/1988 | Gilley et al. |
| 4,779,198 A | 10/1988 | Lurie |
| 4,800,437 A | 1/1989 | Hosoya |
| 4,807,031 A | 2/1989 | Broughton et al. |
| 4,876,736 A | 10/1989 | Kiewit |
| 4,885,632 A | 12/1989 | Mabey et al. |
| 4,907,079 A | 3/1990 | Turner et al. |
| 4,912,552 A | 3/1990 | Allison, III et al. |
| 4,918,516 A | 4/1990 | Freeman |
| 4,930,011 A | 5/1990 | Kiewit |
| 4,931,865 A | 6/1990 | Scarampi |
| 4,943,963 A | 7/1990 | Waechter et al. |
| 4,955,000 A | 9/1990 | Nastrom |
| 4,955,070 A | 9/1990 | Welsh et al. |
| 4,965,825 A | 10/1990 | Harvey et al. |
| 4,972,471 A | 11/1990 | Gross et al. |
| 4,972,503 A | 11/1990 | Zurlinden |
| 4,990,892 A | 2/1991 | Guest et al. |
| 5,023,929 A | 6/1991 | Call |
| 5,081,680 A | 1/1992 | Bennett |
| 5,097,328 A | 3/1992 | Boyette |
| 5,103,675 A | 4/1992 | Komninos |
| 5,119,104 A | 6/1992 | Heller |
| 5,136,644 A | 8/1992 | Audebert et al. |
| 5,146,231 A | 9/1992 | Ghaem et al. |
| 5,165,069 A | 11/1992 | Vitt et al. |
| 5,226,090 A | 7/1993 | Kimura |
| 5,226,177 A | 7/1993 | Nickerson |
| 5,235,414 A | 8/1993 | Cohen |
| 5,251,324 A | 10/1993 | McMullan, Jr. |
| 5,285,498 A | 2/1994 | Johnston |
| 5,294,981 A | 3/1994 | Yazolino et al. |
| 5,319,453 A | 6/1994 | Copriviza et al. |
| 5,335,277 A | 8/1994 | Harvey et al. |
| 5,355,161 A | 10/1994 | Bird et al. |
| 5,382,970 A | 1/1995 | Kiefl |
| 5,387,993 A | 2/1995 | Heller et al. |
| 5,398,055 A | 3/1995 | Nonomura et al. |
| 5,404,161 A | 4/1995 | Douglass et al. |
| 5,404,172 A | 4/1995 | Berman et al. |
| 5,404,377 A | 4/1995 | Moses |
| 5,408,258 A | 4/1995 | Kolessar |
| 5,425,100 A | 6/1995 | Thomas et al. |
| 5,442,343 A | 8/1995 | Cato et al. |
| 5,457,807 A | 10/1995 | Weinblatt |
| 5,473,631 A | 12/1995 | Moses |
| 5,481,294 A | 1/1996 | Thomas et al. |
| 5,483,276 A | 1/1996 | Brooks et al. |
| 5,488,408 A | 1/1996 | Maduzia et al. |
| 5,505,901 A | 4/1996 | Harney et al. |
| 5,512,933 A | 4/1996 | Wheatley et al. |
| 5,550,928 A | 8/1996 | Lu et al. |
| 5,564,088 A | 10/1996 | Saitoh |
| 5,574,962 A | 11/1996 | Fardeau et al. |
| 5,579,124 A | 11/1996 | Aijala et al. |
| 5,581,800 A | 12/1996 | Fardeau et al. |
| 5,583,776 A | 12/1996 | Levi et al. |
| 5,594,934 A | 1/1997 | Lu et al. |
| 5,629,739 A | 5/1997 | Dougherty |
| 5,630,203 A | 5/1997 | Weinblatt |
| 5,640,144 A | 6/1997 | Russo et al. |
| 5,646,675 A | 7/1997 | Copriviza et al. |
| 5,659,367 A | 8/1997 | Yuen |
| 5,692,215 A | 11/1997 | Kutzik et al. |
| 5,760,760 A | 6/1998 | Helms |
| 5,767,922 A | 6/1998 | Zabih et al. |
| 5,771,307 A | 6/1998 | Lu et al. |
| 5,774,876 A | 6/1998 | Woolley et al. |
| 5,787,334 A | 7/1998 | Fardeau et al. |
| 5,793,409 A | 8/1998 | Tetsumura |
| 5,801,747 A | 9/1998 | Bedard |
| 5,812,930 A | 9/1998 | Zavrel |
| 5,815,114 A | 9/1998 | Speasl et al. |
| 5,839,050 A | 11/1998 | Baehr et al. |
| 5,872,588 A | 2/1999 | Aras et al. |
| 5,874,724 A | 2/1999 | Cato |
| 5,884,278 A | 3/1999 | Powell |
| 5,889,548 A | 3/1999 | Chan |
| 5,893,093 A | 4/1999 | Wills |
| 5,894,331 A | 4/1999 | Yang |
| 5,896,554 A | 4/1999 | Itoh et al. |
| 5,963,844 A | 10/1999 | Dail |
| 5,980,246 A | 11/1999 | Ramsay et al. |
| 5,982,808 A | 11/1999 | Otto |
| 6,002,918 A | 12/1999 | Heiman et al. |
| 6,035,177 A | 3/2000 | Moses et al. |
| 6,049,286 A | 4/2000 | Forr |
| 6,054,950 A | 4/2000 | Fontana |

(56) References Cited

U.S. PATENT DOCUMENTS

| | | |
|---|---|---|
| 6,078,672 A | 6/2000 | Saunders et al. |
| 6,091,956 A | 7/2000 | Hollenberg |
| 6,098,048 A | 8/2000 | Dashefsky et al. |
| 6,124,877 A | 9/2000 | Schmidt |
| 6,137,539 A | 10/2000 | Lownes et al. |
| 6,154,548 A | 11/2000 | Bizzan |
| 6,175,634 B1 | 1/2001 | Graumann |
| 6,177,931 B1 | 1/2001 | Alexander et al. |
| 6,184,918 B1 | 2/2001 | Goldschmidt Iki et al. |
| 6,243,739 B1 | 6/2001 | Schwartz et al. |
| 6,252,522 B1 | 6/2001 | Hampton et al. |
| 6,272,176 B1 | 8/2001 | Srinivasan |
| 6,286,140 B1 | 9/2001 | Ivanyi |
| 6,292,943 B1 | 9/2001 | Shin et al. |
| 6,297,859 B1 | 10/2001 | George |
| 6,308,328 B1 | 10/2001 | Bowcutt et al. |
| 6,311,214 B1 | 10/2001 | Rhoads |
| 6,317,854 B1 | 11/2001 | Watanabe |
| 6,359,557 B2 | 3/2002 | Bilder |
| 6,380,988 B1 | 4/2002 | Sung |
| 6,388,662 B2 | 5/2002 | Narui et al. |
| 6,396,413 B2 | 5/2002 | Hines et al. |
| 6,400,996 B1 | 6/2002 | Hoffberg et al. |
| 6,421,445 B1 | 7/2002 | Jensen et al. |
| 6,424,264 B1 | 7/2002 | Giraldin et al. |
| 6,430,498 B1 | 8/2002 | Maruyama et al. |
| 6,433,689 B1 | 8/2002 | Hovind et al. |
| 6,446,261 B1 | 9/2002 | Rosser |
| 6,457,010 B1 | 9/2002 | Eldering et al. |
| 6,463,413 B1 | 10/2002 | Applebaum et al. |
| 6,467,089 B1 | 10/2002 | Aust et al. |
| 6,470,264 B2 | 10/2002 | Bide |
| 6,477,508 B1 | 11/2002 | Lazar et al. |
| 6,484,316 B1 | 11/2002 | Lindberg |
| 6,487,719 B1 | 11/2002 | Itoh et al. |
| 6,493,649 B1 | 12/2002 | Jones et al. |
| 6,497,658 B2 | 12/2002 | Roizen et al. |
| 6,519,769 B1 | 2/2003 | Hopple et al. |
| 6,523,175 B1 | 2/2003 | Chan |
| 6,529,212 B2 | 3/2003 | Miller et al. |
| 6,542,878 B1 | 4/2003 | Heckerman et al. |
| 6,563,423 B2 | 5/2003 | Smith |
| 6,563,430 B1 | 5/2003 | Kemink et al. |
| 6,567,978 B1 | 5/2003 | Jarrell |
| 6,570,559 B1 | 5/2003 | Oshima |
| 6,577,238 B1 | 6/2003 | Whitesmith et al. |
| 6,614,987 B1 | 9/2003 | Ismail et al. |
| 6,647,212 B1 | 11/2003 | Toriumi et al. |
| 6,647,548 B1 | 11/2003 | Lu et al. |
| 6,654,800 B1 | 11/2003 | Rieger, III |
| 6,675,383 B1 | 1/2004 | Wheeler et al. |
| 6,681,396 B1 | 1/2004 | Bates et al. |
| 6,697,628 B1 | 2/2004 | Green et al. |
| 6,703,918 B1 | 3/2004 | Kita |
| 6,707,762 B1 | 3/2004 | Goodman et al. |
| 6,731,942 B1 | 5/2004 | Nageli |
| 6,738,044 B2 | 5/2004 | Holzrichter et al. |
| 6,748,317 B2 | 6/2004 | Maruyama et al. |
| 6,766,524 B1 | 7/2004 | Matheny et al. |
| 6,788,704 B1 | 9/2004 | Lindsay |
| 6,791,472 B1 | 9/2004 | Hoffberg |
| 6,842,877 B2 | 1/2005 | Robarts et al. |
| 6,862,541 B2 | 3/2005 | Mizushima |
| 6,882,837 B2 | 4/2005 | Fernandez et al. |
| 6,888,457 B2 | 5/2005 | Wilkinson et al. |
| 6,890,285 B2 | 5/2005 | Rahman et al. |
| 6,898,434 B2 | 5/2005 | Pradhan et al. |
| 6,917,686 B2 | 7/2005 | Jot et al. |
| 6,919,803 B2 | 7/2005 | Breed |
| 6,928,280 B1 | 8/2005 | Xanthos et al. |
| 6,934,508 B2 | 8/2005 | Ceresoli et al. |
| 6,940,403 B2 | 9/2005 | Kail, IV |
| 6,946,803 B2 | 9/2005 | Moore |
| 6,954,745 B2 | 10/2005 | Rajan |
| 6,958,710 B2 | 10/2005 | Zhang et al. |
| 6,967,674 B1 | 11/2005 | Lausch |
| 6,970,131 B2 | 11/2005 | Percy et al. |
| 6,983,225 B2 | 1/2006 | Sprogis et al. |
| 7,038,619 B2 | 5/2006 | Percy et al. |
| 7,046,162 B2 | 5/2006 | Dunstan |
| 7,047,548 B2 | 5/2006 | Bates et al. |
| 7,051,352 B2 | 5/2006 | Schaffer |
| 7,076,441 B2 | 7/2006 | Hind et al. |
| 7,076,733 B2 | 7/2006 | Smith |
| 7,080,061 B2 | 7/2006 | Kabala |
| 7,099,676 B2 | 8/2006 | Law et al. |
| 7,100,181 B2 | 8/2006 | Srinivasan et al. |
| 7,102,615 B2 | 9/2006 | Marks |
| 7,126,454 B2 | 10/2006 | Bulmer |
| 7,130,797 B2 | 10/2006 | Beaucoup et al. |
| 7,148,803 B2 | 12/2006 | Bandy et al. |
| 7,150,030 B1 | 12/2006 | Eldering et al. |
| 7,155,159 B1 | 12/2006 | Weinblatt et al. |
| 7,171,331 B2 | 1/2007 | Vock et al. |
| 7,222,071 B2 | 5/2007 | Neuhauser et al. |
| 7,284,255 B1 | 10/2007 | Apel et al. |
| 7,295,108 B2 | 11/2007 | Corrado et al. |
| 7,295,114 B1 | 11/2007 | Drzaic et al. |
| 7,343,615 B2 | 3/2008 | Nelson et al. |
| 7,363,028 B2 | 4/2008 | de Clerq et al. |
| 7,373,820 B1 | 5/2008 | James |
| 7,411,631 B1 | 8/2008 | Joshi et al. |
| 7,428,310 B2 | 9/2008 | Park |
| 7,460,827 B2 | 12/2008 | Schuster et al. |
| 7,463,143 B2 | 12/2008 | Forr et al. |
| 7,471,987 B2 | 12/2008 | Crystal et al. |
| 7,483,975 B2 | 1/2009 | Kolessar et al. |
| 7,555,766 B2 | 6/2009 | Kondo et al. |
| 7,587,728 B2 | 9/2009 | Wheeler et al. |
| 7,587,732 B2 | 9/2009 | Wright et al. |
| 7,627,139 B2 | 12/2009 | Marks et al. |
| 7,640,141 B2 | 12/2009 | Kolessar et al. |
| 7,647,604 B2 | 1/2010 | Ramaswamy |
| 7,665,104 B2 | 2/2010 | Maehara et al. |
| 7,668,188 B2 | 2/2010 | Chang et al. |
| 7,680,653 B2 | 3/2010 | Yeldener |
| 7,712,114 B2 | 5/2010 | Ramaswamy |
| 7,739,705 B2 | 6/2010 | Lee et al. |
| 7,739,718 B1 | 6/2010 | Young et al. |
| 7,760,248 B2 | 7/2010 | Marks et al. |
| 7,769,757 B2 | 8/2010 | Grefenstette et al. |
| 7,786,987 B2 | 8/2010 | Nielsen |
| 7,792,660 B2 | 9/2010 | Iyengar |
| 7,793,316 B2 | 9/2010 | Mears et al. |
| 7,796,516 B2 | 9/2010 | Todd et al. |
| 7,880,613 B1 | 2/2011 | Maeng |
| 7,882,514 B2 | 2/2011 | Nielsen et al. |
| 7,920,713 B2 | 4/2011 | Wells et al. |
| 7,954,120 B2 | 5/2011 | Roberts et al. |
| 7,958,526 B2 | 6/2011 | Wheeler et al. |
| 7,962,929 B1 | 6/2011 | Oddo et al. |
| 8,046,798 B1 | 10/2011 | Schlack et al. |
| 8,060,372 B2 | 11/2011 | Topchy et al. |
| 8,065,703 B2 | 11/2011 | Wilson et al. |
| 8,108,888 B2 | 1/2012 | Ramaswamy |
| 8,156,517 B2 | 4/2012 | Nielsen |
| 8,180,712 B2 | 5/2012 | Nelson et al. |
| 8,189,748 B2 | 5/2012 | Susama et al. |
| 8,239,887 B2 | 8/2012 | Gilboa et al. |
| 8,245,249 B2 | 8/2012 | Lee |
| 8,249,992 B2 | 8/2012 | Harkness et al. |
| 8,260,927 B2 | 9/2012 | Coronado et al. |
| 8,266,644 B2 | 9/2012 | Randolph et al. |
| 8,295,217 B2 | 10/2012 | Kone et al. |
| 8,345,620 B2 | 1/2013 | Chen et al. |
| 8,526,626 B2 | 9/2013 | Nielsen et al. |
| 8,549,552 B2 | 10/2013 | Ramaswamy et al. |
| 8,699,723 B2 | 4/2014 | Fried et al. |
| 8,738,763 B2 | 5/2014 | Crystal et al. |
| 8,793,717 B2 | 7/2014 | Lee |
| 8,810,392 B1 | 8/2014 | Teller et al. |
| 8,826,314 B2 | 9/2014 | Wang et al. |
| 8,855,101 B2 | 10/2014 | Chen |
| 8,863,166 B2 | 10/2014 | Harsh et al. |

(56) References Cited

U.S. PATENT DOCUMENTS

| | | |
|---|---|---|
| 8,885,842 B2 | 11/2014 | Chen |
| 9,021,516 B2 | 4/2015 | Nielsen |
| 9,027,043 B2 | 5/2015 | Johnson |
| 9,094,710 B2 | 7/2015 | Lee et al. |
| 9,118,960 B2 | 8/2015 | Nielsen |
| 9,191,704 B2 | 11/2015 | Nielsen |
| 9,197,930 B2 | 11/2015 | Lee |
| 9,219,969 B2 | 12/2015 | Nielsen |
| 9,264,748 B2 | 2/2016 | Nielsen |
| 9,473,795 B2 | 10/2016 | Stokes et al. |
| 2002/0010919 A1 | 1/2002 | Lu et al. |
| 2002/0012353 A1 | 1/2002 | Gerszberg et al. |
| 2002/0015112 A1 | 2/2002 | Nagakubo et al. |
| 2002/0026635 A1 | 2/2002 | Wheeler et al. |
| 2002/0056087 A1 | 5/2002 | Berezowski et al. |
| 2002/0057893 A1 | 5/2002 | Wood et al. |
| 2002/0059218 A1 | 5/2002 | August et al. |
| 2002/0059577 A1 | 5/2002 | Lu et al. |
| 2002/0068556 A1 | 6/2002 | Brown |
| 2002/0072952 A1 | 6/2002 | Hamzy et al. |
| 2002/0077880 A1 | 6/2002 | Gordon et al. |
| 2002/0080286 A1 | 6/2002 | Dagtas et al. |
| 2002/0083435 A1 | 6/2002 | Blasko et al. |
| 2002/0097885 A1 | 7/2002 | Birchfield et al. |
| 2002/0141730 A1 | 10/2002 | Haken |
| 2002/0144259 A1 | 10/2002 | Gutta et al. |
| 2002/0150387 A1 | 10/2002 | Kunii et al. |
| 2002/0166119 A1 | 11/2002 | Cristofalo |
| 2002/0174425 A1 | 11/2002 | Markel et al. |
| 2002/0198762 A1 | 12/2002 | Donato |
| 2003/0033600 A1 | 2/2003 | Cliff et al. |
| 2003/0040272 A1 | 2/2003 | Lelievre et al. |
| 2003/0046685 A1 | 3/2003 | Srinivasan et al. |
| 2003/0054757 A1 | 3/2003 | Kolessar et al. |
| 2003/0056215 A1 | 3/2003 | Kanungo |
| 2003/0067459 A1 | 4/2003 | Lim |
| 2003/0070182 A1 | 4/2003 | Pierre et al. |
| 2003/0093784 A1 | 5/2003 | Dimitrova et al. |
| 2003/0093790 A1 | 5/2003 | Logan et al. |
| 2003/0097302 A1 | 5/2003 | Overhultz et al. |
| 2003/0101449 A1 | 5/2003 | Bentolila et al. |
| 2003/0110485 A1 | 6/2003 | Lu et al. |
| 2003/0115591 A1 | 6/2003 | Weissmueller, Jr. et al. |
| 2003/0122708 A1 | 7/2003 | Percy et al. |
| 2003/0126593 A1 | 7/2003 | Mault |
| 2003/0131350 A1 | 7/2003 | Peiffer et al. |
| 2003/0136827 A1 | 7/2003 | Kaneko et al. |
| 2003/0146871 A1 | 8/2003 | Karr et al. |
| 2003/0171833 A1 | 9/2003 | Crystal et al. |
| 2003/0177488 A1 | 9/2003 | Smith et al. |
| 2003/0194004 A1 | 10/2003 | Srinivasan |
| 2003/0208754 A1 | 11/2003 | Sridhar et al. |
| 2003/0216120 A1 | 11/2003 | Ceresoli et al. |
| 2003/0222819 A1 | 12/2003 | Karr et al. |
| 2003/0222820 A1 | 12/2003 | Karr et al. |
| 2004/0003073 A1 | 1/2004 | Krzyzanowski et al. |
| 2004/0003394 A1 | 1/2004 | Ramaswamy |
| 2004/0019675 A1 | 1/2004 | Hebeler, Jr. et al. |
| 2004/0025174 A1 | 2/2004 | Cerrato |
| 2004/0027271 A1 | 2/2004 | Schuster et al. |
| 2004/0039855 A1 | 2/2004 | Bohrer et al. |
| 2004/0055020 A1 | 3/2004 | Delpuch |
| 2004/0058675 A1 | 3/2004 | Lu et al. |
| 2004/0072577 A1 | 4/2004 | Myllymaki et al. |
| 2004/0073615 A1 | 4/2004 | Darling |
| 2004/0073915 A1 | 4/2004 | Dureau |
| 2004/0073918 A1 | 4/2004 | Ferman et al. |
| 2004/0088212 A1 | 5/2004 | Hill |
| 2004/0088721 A1 | 5/2004 | Wheeler et al. |
| 2004/0095276 A1 | 5/2004 | Krumm et al. |
| 2004/0100437 A1 | 5/2004 | Hunter et al. |
| 2004/0117816 A1 | 6/2004 | Karaoguz et al. |
| 2004/0122679 A1 | 6/2004 | Neuhauser et al. |
| 2004/0181799 A1 | 9/2004 | Lu et al. |
| 2004/0198386 A1 | 10/2004 | Dupray |
| 2004/0210922 A1 | 10/2004 | Peiffer et al. |
| 2004/0218701 A1 | 11/2004 | Singh et al. |
| 2004/0233126 A1 | 11/2004 | Moore |
| 2004/0266457 A1 | 12/2004 | Dupray |
| 2005/0006466 A1 | 1/2005 | Overhultz et al. |
| 2005/0035857 A1 | 2/2005 | Zhang et al. |
| 2005/0054285 A1 | 3/2005 | Mears et al. |
| 2005/0057550 A1 | 3/2005 | George |
| 2005/0060740 A1 | 3/2005 | Stecyk |
| 2005/0125820 A1 | 6/2005 | Nelson et al. |
| 2005/0141345 A1 | 6/2005 | Holm et al. |
| 2005/0144632 A1 | 6/2005 | Mears et al. |
| 2005/0172311 A1 | 8/2005 | Hjelt et al. |
| 2005/0200476 A1 | 9/2005 | Forr et al. |
| 2005/0201826 A1 | 9/2005 | Zhang et al. |
| 2005/0203798 A1 | 9/2005 | Jensen et al. |
| 2005/0204379 A1 | 9/2005 | Yamamori |
| 2005/0207592 A1 | 9/2005 | Sporer et al. |
| 2005/0216509 A1 | 9/2005 | Kolessar et al. |
| 2005/0221774 A1 | 10/2005 | Ceresoli et al. |
| 2005/0234774 A1 | 10/2005 | Dupree |
| 2005/0243784 A1 | 11/2005 | Fitzgerald et al. |
| 2005/0244011 A1 | 11/2005 | Kim |
| 2005/0244012 A1 | 11/2005 | Asada |
| 2005/0264430 A1 | 12/2005 | Zhang et al. |
| 2005/0277401 A1 | 12/2005 | Watabe |
| 2005/0286860 A1 | 12/2005 | Conklin |
| 2006/0053110 A1 | 3/2006 | McDonald et al. |
| 2006/0062401 A1 | 3/2006 | Neervoort et al. |
| 2006/0075421 A1 | 4/2006 | Roberts et al. |
| 2006/0075428 A1 | 4/2006 | Farmer et al. |
| 2006/0080314 A1 | 4/2006 | Hubert et al. |
| 2006/0093998 A1 | 5/2006 | Vertegaal |
| 2006/0109384 A1 | 5/2006 | Miller-Smith et al. |
| 2006/0168613 A1 | 7/2006 | Wood et al. |
| 2006/0171474 A1 | 8/2006 | Ramaswamy et al. |
| 2006/0184780 A1 | 8/2006 | Yamada et al. |
| 2006/0195857 A1 | 8/2006 | Wheeler et al. |
| 2006/0204012 A1 | 9/2006 | Marks et al. |
| 2006/0209632 A1 | 9/2006 | Goodman et al. |
| 2006/0212895 A1 | 9/2006 | Johnson |
| 2006/0225106 A1 | 10/2006 | Bedingfield, Jr. |
| 2006/0232575 A1 | 10/2006 | Nielsen |
| 2007/0005301 A1 | 1/2007 | Iyengar |
| 2007/0006275 A1 | 1/2007 | Wright et al. |
| 2007/0011040 A1 | 1/2007 | Wright et al. |
| 2007/0018708 A1 | 1/2007 | Yoo |
| 2007/0050832 A1 | 3/2007 | Wright et al. |
| 2007/0055987 A1 | 3/2007 | Lu et al. |
| 2007/0061830 A1 | 3/2007 | Chang |
| 2007/0063850 A1 | 3/2007 | Devaul et al. |
| 2007/0186228 A1 | 8/2007 | Ramaswamy et al. |
| 2007/0192782 A1 | 8/2007 | Ramaswamy |
| 2007/0250901 A1 | 10/2007 | Mcintire et al. |
| 2007/0266395 A1 | 11/2007 | Lee et al. |
| 2007/0288277 A1 | 12/2007 | Neuhauser et al. |
| 2007/0288476 A1 | 12/2007 | Flanagan, III et al. |
| 2007/0288628 A1 | 12/2007 | Sadovsky et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0028427 A1 | 1/2008 | Nesvadba et al. |
| 2008/0059988 A1 | 3/2008 | Lee et al. |
| 2008/0091087 A1 | 4/2008 | Neuhauser et al. |
| 2008/0101454 A1 | 5/2008 | Luff et al. |
| 2008/0112574 A1 | 5/2008 | Brennan et al. |
| 2008/0130906 A1 | 6/2008 | Goldstein et al. |
| 2008/0148307 A1 | 6/2008 | Nielsen et al. |
| 2008/0148309 A1 | 6/2008 | Wilcox et al. |
| 2008/0154858 A1 | 6/2008 | Manavoglu et al. |
| 2008/0204273 A1 | 8/2008 | Crystal et al. |
| 2008/0276265 A1 | 11/2008 | Topchy et al. |
| 2008/0300700 A1 | 12/2008 | Hammer et al. |
| 2009/0037575 A1 | 2/2009 | Crystal et al. |
| 2009/0055170 A1 | 2/2009 | Nagahama |

(56) References Cited

U.S. PATENT DOCUMENTS

| | | |
|---|---|---|
| 2009/0064252 A1 | 3/2009 | Howarter et al. |
| 2009/0070797 A1 | 3/2009 | Ramaswamy et al. |
| 2009/0133058 A1 | 5/2009 | Kouritzin et al. |
| 2009/0141908 A1 | 6/2009 | Jeong et al. |
| 2009/0169024 A1 | 7/2009 | Krug et al. |
| 2009/0192805 A1 | 7/2009 | Topchy et al. |
| 2009/0225994 A1 | 9/2009 | Topchy et al. |
| 2009/0259325 A1 | 10/2009 | Topchy et al. |
| 2009/0260027 A1 | 10/2009 | Weinblatt |
| 2009/0265729 A1 | 10/2009 | Weinblatt |
| 2009/0285409 A1 | 11/2009 | Yoshizawa et al. |
| 2009/0296526 A1 | 12/2009 | Amada |
| 2010/0083299 A1 | 4/2010 | Nelson et al. |
| 2010/0162285 A1 | 6/2010 | Cohen et al. |
| 2010/0169908 A1 | 7/2010 | Nielsen |
| 2010/0199296 A1 | 8/2010 | Lee et al. |
| 2010/0211967 A1 | 8/2010 | Ramaswamy et al. |
| 2010/0303254 A1 | 12/2010 | Yoshizawa et al. |
| 2011/0016231 A1 | 1/2011 | Ramaswamy et al. |
| 2011/0019835 A1 | 1/2011 | Schmidt et al. |
| 2011/0055577 A1 | 3/2011 | Candelore et al. |
| 2011/0061088 A1 | 3/2011 | Rieger et al. |
| 2011/0091055 A1 | 4/2011 | LeBlanc |
| 2011/0110531 A1 | 5/2011 | Klefenz et al. |
| 2011/0122258 A1 | 5/2011 | Masuda |
| 2011/0126222 A1 | 5/2011 | Wright et al. |
| 2011/0239253 A1 | 9/2011 | West et al. |
| 2012/0020486 A1 | 1/2012 | Fried et al. |
| 2012/0102515 A1 | 4/2012 | Ramaswamy |
| 2012/0102518 A1 | 4/2012 | Wheeler et al. |
| 2012/0120218 A1 | 5/2012 | Flaks et al. |
| 2012/0124602 A1 | 5/2012 | Tan et al. |
| 2012/0148058 A1 | 6/2012 | Chen |
| 2012/0148067 A1 | 6/2012 | Petersen et al. |
| 2012/0159529 A1 | 6/2012 | Nielsen |
| 2012/0169359 A1 | 7/2012 | Kim et al. |
| 2012/0219156 A1 | 8/2012 | Ramaswamy et al. |
| 2012/0304212 A1 | 11/2012 | Lee |
| 2012/0307877 A1 | 12/2012 | Delbecq |
| 2013/0034244 A1 | 2/2013 | Van Raalte et al. |
| 2013/0084056 A1 | 4/2013 | Harsh et al. |
| 2013/0121499 A1 | 5/2013 | Li et al. |
| 2013/0160042 A1* | 6/2013 | Stokes .................. H04N 21/24 725/18 |
| 2013/0166050 A1 | 6/2013 | Duwenhorst |
| 2013/0232517 A1 | 9/2013 | Reis dos Santos |
| 2013/0238276 A1 | 9/2013 | Vock et al. |
| 2014/0007153 A1 | 1/2014 | Nielsen et al. |
| 2014/0059579 A1 | 2/2014 | Vinson et al. |
| 2014/0126746 A1 | 5/2014 | Shin et al. |
| 2014/0150001 A1 | 5/2014 | McMillan |
| 2014/0250448 A1 | 9/2014 | Nielsen |
| 2014/0259039 A1 | 9/2014 | Nielsen |
| 2014/0270195 A1 | 9/2014 | Nielsen |
| 2014/0282640 A1 | 9/2014 | Nielsen |
| 2014/0282663 A1 | 9/2014 | Lee |
| 2014/0302773 A1 | 10/2014 | Jantunen et al. |
| 2014/0380349 A1 | 12/2014 | Shankar et al. |
| 2015/0006286 A1 | 1/2015 | Liu et al. |
| 2015/0052541 A1 | 2/2015 | Chen |
| 2015/0052542 A1 | 2/2015 | Reis dos Santos et al. |
| 2015/0195592 A1 | 7/2015 | Nielsen |
| 2015/0319491 A1 | 11/2015 | Nielsen |

FOREIGN PATENT DOCUMENTS

| | | |
|---|---|---|
| CN | 1244982 A | 2/2000 |
| CN | 1882961 | 12/2006 |
| CN | 101419437 | 4/2009 |
| CN | 201331687 | 10/2009 |
| CN | 102981418 | 3/2013 |
| DE | 3401762 | 8/1985 |
| EP | 283570 | 9/1988 |
| EP | 593202 | 4/1994 |
| EP | 946012 | 9/1999 |
| EP | 1133090 | 9/2001 |
| EP | 1160772 | 12/2001 |
| EP | 1213860 | 6/2002 |
| EP | 1318679 | 6/2003 |
| EP | 1411326 | 4/2004 |
| GB | 1574964 | 9/1980 |
| GB | 2260246 | 4/1993 |
| GB | 2292506 | 2/1996 |
| JP | 63084396 | 4/1988 |
| JP | 8331482 | 12/1996 |
| JP | 2000224617 | 8/2000 |
| JP | 2000307520 | 11/2000 |
| JP | 2000307530 | 11/2000 |
| JP | 2003061027 | 2/2003 |
| JP | 2003125102 | 4/2003 |
| JP | 2003279400 | 10/2003 |
| JP | 2005020233 | 1/2005 |
| JP | 2005322262 | 11/2005 |
| JP | 2006194700 | 7/2006 |
| JP | 2006215774 | 8/2006 |
| JP | 2006254297 | 9/2006 |
| JP | 4219749 B2 | 2/2009 |
| JP | 2010171606 | 5/2010 |
| JP | 2010257278 | 11/2010 |
| JP | 2012507904 | 3/2012 |
| JP | 2012095014 | 5/2012 |
| JP | 2012242214 | 12/2012 |
| KR | 20020000288 | 1/2002 |
| KR | 100911679 | 8/2009 |
| KR | 1020040004648 | 8/2009 |
| KR | 20100048330 | 5/2010 |
| KR | 1020120067477 | 6/2012 |
| KR | 20120131826 | 12/2012 |
| WO | 8810540 | 12/1988 |
| WO | 9111062 | 7/1991 |
| WO | 9115062 | 10/1991 |
| WO | 9411989 | 5/1994 |
| WO | 9512278 | 5/1995 |
| WO | 9526106 | 9/1995 |
| WO | 9731440 | 8/1997 |
| WO | 9810539 | 3/1998 |
| WO | 9832251 | 7/1998 |
| WO | 9933206 | 7/1999 |
| WO | 9955057 | 10/1999 |
| WO | 9959275 | 11/1999 |
| WO | 0038360 | 6/2000 |
| WO | 072484 | 11/2000 |
| WO | 0111506 | 2/2001 |
| WO | 0131816 | 5/2001 |
| WO | 0145103 | 6/2001 |
| WO | 0161892 | 8/2001 |
| WO | 0219581 | 3/2002 |
| WO | 02052759 | 7/2002 |
| WO | 02097791 | 12/2002 |
| WO | 03049339 | 6/2003 |
| WO | 03052552 | 6/2003 |
| WO | 03060630 | 7/2003 |
| WO | 2003077455 | 9/2003 |
| WO | 03087871 | 10/2003 |
| WO | 2004051303 | 6/2004 |
| WO | 2004051304 | 6/2004 |
| WO | 2005032145 | 4/2005 |
| WO | 2005038625 | 4/2005 |
| WO | 2005041166 | 5/2005 |
| WO | 2005055601 | 6/2005 |
| WO | 2005065159 | 7/2005 |
| WO | 2005079457 | 9/2005 |
| WO | 2006012629 | 2/2006 |
| WO | 2006020560 | 2/2006 |
| WO | 2006037014 | 4/2006 |
| WO | 2006096177 | 9/2006 |
| WO | 2006121681 | 11/2006 |
| WO | 2007022250 | 2/2007 |
| WO | 2007120518 | 10/2007 |
| WO | 2008033136 | 3/2008 |

(56) References Cited

FOREIGN PATENT DOCUMENTS

| | | |
|---|---|---|
| WO | 2010049809 | 5/2010 |
| WO | 2011115945 | 9/2011 |

OTHER PUBLICATIONS

"Arbitron & Scarborough Unveil New Mall Shopper Audience Measurement", [online]. Streamline Media Inc., Jun. 22, 2007 [retrieved in 2007]. Retrieved from the Internet: <URL: www.radioink.com>. (2 pages).

"Arkon Sound Feeder II FM Transmitter", [online]. Yahoo Shopping, 2002 [retrieved on Sep. 29, 2004]. Retrieved from the Internet: <URL: http://store.yahoo.com/semsons-inc/arsoundfeedii.html>. (2 pages).

"Cricket v2 User Manual," Cricket Project, MIT Computer Science and Artificial Intelligence Lab, Cambridge, U.S.A., Jan. 2005 (57 pages).

"Discovery Spy Motion Tracking System", [online]. Discovery Communications Inc., 2004 [retrieved on Sep. 14, 2004]. Retrieved from the Internet: <URL: http://shopping.discovery.com/stores/servlel/Produc!Display?catalogId=1OOOO&storeId=1OOOO&lanlan=-1 &productId=53867&partnumber=689638>. (3 pages).

"Dust Networks—SmartMesh", [online]. Dust Networks Inc., 2002 [retrieved on Sep. 29, 2004]. Retrieved from the Internet: <URL: www.dustnetworks.com>. (2 pages).

"Eltek GenII Radio Data Logging System", [online]. Eltek Lid., 2004 [retrieved on Sep. 29, 2004]. Retrieved from the Internet: <URL: www.elteckdataloggers.co.uk>. (4 pages).

Radio Shack, "FM Wireless Microphone Module Kits", [online]. Horizon Industries, 2004 [retrieved on Sep. 30, 2004]. Retrieved from the Internet: <URL: www.horizonindustries.com/fm.htm>. (1 page).

"New Sonitor Patent Combines Ultrasound and RFID", [online]. Sonitor Technologies, Feb. 17, 2005 [retrieved on Jun. 13, 2005]. Retrieved from the Internet: <URL: http://sonitor.com/news/article.asp?id=73>. (1 page).

"NIST Location System", [online]. Wireless Communication Technologies Group, National Institute of Standards and Technology, Mar. 12, 2004 [retrieved in Nov. 1, 2004]. Retrieved from the Internet: <URL: www.antd.nisl.gov>. (2 pages).

"The Nibble Location System", [online]. UCLA, May 21, 2001 [retrieved on Nov. 2, 2004]. Retrieved from the Internet: <URL: http://mmsl.cs.ucla.edu/nibble/>. (13 pages).

"UHF Radio Data Logging System—GenII Data Logger", [online]. Amplicon, 2004 [retrieved on Sep. 29, 2004]. Retrieved from the Internet: <URL: www.amplicon.co.uk/dr-prod3.cfm/subsecid/10037/secid/1/groupid/11809.htm>. (3 pages).

"University Library Navigation Enabled by Ekahau", [online]. Directions Magazine, Jun. 12, 2003 [Aug. 3, 2007]. Retrieved from the Internet: <URL: http://www/directionsmag.com/press.releases/index.php?duty=Show&id=7276&trv=1>. (3 pages).

"Worlds Smallest Hands Free Radio," [online]. Yahoo Shopping, 2004 [retrieved on Sep. 29, 2004]. Retrieved from the Internet: <URL: http://store.yahoo.com/latesttrends/worsmalhanfr.html>. (1 page).

"X1 Button Radio—The World's Smallest Radio", [online]. Exxun, 2004 [retrieved on Sep. 29, 2004]. Retrieved from the Internet: <URL: www.exxun.com>. (2 pages).

Azondekon et al., "Service Selection in Networks Based on Proximity Confirmation Using Infrared", http://www.scs.carleton.ca/-barbeau/Publications/2002/azondekon.pdf, International Conference on Telecommunications (ICT) Beijing, 2002 (5 Pages).

Bahl et al., "A Software System for Locating Mobile Users: Design, Evaluation, and Lessons," Technical Report MSR-TR-2000-12 Microsoft Research, [retrieved from internet, http://research.microsofl.com/-bahl/Papers/Pdf/radar.pdf] Feb. 2000 (13 pages).

Battelle, Report: "Lexington Area Travel Data Collection Test; GPS for Personal Travel Surveys", Final Report for Office of Highway Information Management, Office of Technology Application and Federal Highway Administration, Sep. 1997 (92 pages).

Battiti et al. "Location-Aware Computing: a Neutral Network Model for Determining Location in Wireless LANS" University of Trento: Department of Information and Communication Technology, Technical Report #DIT-02-0083, Feb. 2002 (pp. 1-16).

Bernstein et al., "An Introduction to Map Matching for Personal Navigation Assistants," New Jersey Tide Center, New Jersey Institute ofTechnology, Aug. 1996 (17 pages).

Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).

Ferguson, Michael, "XTension Tech Notes," [online]. Sand Hill Engineering Inc., Dec. 10, 1998 [retrieved in Jan. 12, 2004]. Retrieved from the Internet: <URL: http://www.shed.com/articles/TN.proximity.html >. (9 pages).

Schuman, Evan. "Smarter Smart Cart?" [online]. Storefront Backtalk, Feb. 16, 2005 [retrieved on Nov. 20, 2006]. Retrieved from the Internet: <URL: www.storefrontbacktalk.com>. (5 pages).

"Cricket Project", "Cricket v2 User Manual," MIT Computer Science and Artificial Intelligence Lab, Cambridge, U.S.A., Jan. 2005 (57 pages).

"Discovery Spy Motion Tracking System", [online]. Discovery Communications Inc., 2004 [retrieved on Sep. 14, 2004]. Retrieved from the Internet: <URL: http://shopping.discovery.com/stores/servlel/Produc!Display?catalogId=10000&storeId=10000&lanlan=-1 &productId=53867&partnumber=689638>. (3 pages).

"Eltek Genll Radio Data Logging System", [online]. Eltek Lid., 2004 [retrieved on Sep. 29, 2004]. Retrieved from the Internet: <URL: www.elteckdataloggers.co.uk>. (4 pages).

"FM Wireless Microphone Module Kits", [online]. Horizon Industries, 2004 [retrieved on Sep. 30, 2004]. Retrieved from the Internet: <URL: www.horizonindustries.com/fm.htm>. (1 page).

"New Sonitor Patent Combines Ultrasound and RFID", [online]. Sonitor Technologies, Feb. 17, 2005 [retrieved on Jun. 13, 2005]. Retrieved from the Internet: <URL: http://sonitor.com/news/article.asp?id=73>. (1 pages).

"UHF Radio Data Logging System—GenII Data Logger", [online]. Amplicon, 2004 [retrieved on Sep. 29, 2004]. Retrieved from the Internet: <URL: www.amplicon.co.uk/dr-prod3.cfm/subsecid/10037/secid/1/groupid/11809.htm>. (3 pages).

"University Library Navigation Enabled by Ekahau", [online]. Directions Magazine, Jun. 12, 2003 [Aug. 3, 2007]. Retrieved from the Internet: <URL: http://www/directionsmag.com/press.releases/index.php? duty=Show&id=7276&trv=1>. (3 pages).

"World's Smallest Hands Free Radio," [online]. Yahoo Shopping, 2004 [retrieved on Sep. 29, 2004]. Retrieved from the Internet: <URL: http://store.yahoo.com/latesttrends/worsmalhanfr.html>. (1 page).

Battiti et al. "Location-Aware Computing: a Neural Network Model for Determining Location in Wireless LANS" University of Trento: Department of Information and Communication Technology, Technical Report #DIT-02-0083, Feb. 2002 (pp. 1-16).

Gentile et al., "Robust Location using System Dynamics and Motion Constraints," National Institute of Standards and Technology, Wireless Communication Technologies Group, Jun. 24, 2004 (5 pages).

Handy et al., "Lessons Learned from Developing a Bluetooth Multiplayer-Game," 2nd International Conference on Pervasive Computing, Workshop on Gaming, [retrieved from internet, http://www.ipsi.fraunhofer.de/ambiente/pervasivegaming/papers/Handy_Pervasive2004.pdf] (pages 7).

Holm, Sverre, "Technology Presentation," [online]. Sonitor Technologies, May 26, 2004 [retrieved on Oct. 13, 2004]. Retrieved from the Internet: <URL: www.sonitor.com/news/article.asp?id=62> (16 pages).

Kanellos, Michael. "Dust Makes Mesh of Wireless Sensors," [online]. CNET News.com, Sep. 20, 2004 [retrieved on Sep. 29, 2004]. Retrieved from the Internet: <URL: http://www.news.com/Dust-makes-mesh-of-wireless-sensors/2100-1008_3-5374971.html?tag=item>. (2 pages).

(56) References Cited

OTHER PUBLICATIONS

Kerschbaumer, Ken, "Who's Really Watching?" PricewaterhouseCoopers Global Entertainment and Medai Outlook 2004-2008, May 16, 2005 (4 pages).
McCarthy et al., "RF Free Ultrasonic Positioning (Presentation)," 7th International Symposiom on Wearable Computers, Oct. 2003 (12 pages).
McCarthy et al., "RF Free Ultrasonic Positioning," Department of Computer Science, University of Bristol, U.K., 2003 (7 pages).
Yeung, K.L., & Yum, T.-S.P. "A Comparative Study on Location Tracking Strategies in Cellular Mobile Radio Systems," Global Telecommunications Conference, 1995. Globecom '95, IEEE, Nov. 14-26, 1995 (pp. 22-28 vol. 1).
United States Patent and Trademark Office, "Non-Final Office Action," issued in connection with U.S. Appl. No. 12/757,755 dated Sep. 20, 2010 (10 pages).
United States Patent and Trademark Office, "Final Office Action," issued in U.S. Appl. No. 11/692,087 dated Oct. 30, 2009 (15 pages).
United States Patent and Trademark Office, "Notice of Allowance," issued in U.S. Appl. No. 11/692,087 dated Jan. 12, 2010 (8 pages).
United States Patent and Trademark Office, "Notice of Allowance," issued in U.S. Appl. No. 12/757,755 dated Mar. 23, 2015 (9 pages).
United States Patent and Trademark Office, "Decision on Appeal," issued in U.S. Appl. No. 12/757,755 dated Dec. 17, 2014 (3 pages).
Japan Patent Office, "Notice of Reasons for Rejection," issued in connection with Japanese Patent Application No. 2011-121053, dated Feb. 14, 2013 (2 pages).
United States Patent and Trademark Office, "Non-Final Office Action," issued in connection with U.S. Appl. No. 14/313,414, dated Mar. 13, 2015 (13 pages).
United States Patent and Trademark Office. "Notice of Allowance," issued in connection with U.S. Appl. No. 13/791,432, dated Apr. 10, 2015 (9 pages).
United States Patent and Trademark Office, "Notice of Allowance," issued in connection with U.S. Appl. No. 14/313,414 dated Jul. 17, 2015 (25 pages).
United States Patent and Trademark Office, "Notice of Allowance," issued in connection with U.S. Appl. No. 13/791,432, dated Jul. 9, 2014 (37 pages).
United States Patent and Trademark Office, "Non-Final Office Action," issued in connection with U.S. Appl. No. 13/791,432 dated Mar. 18, 2014 (7 pages).
International Searching Authority, "International Search Report," issued in connection with International Patent Application No. PCT/US2014/020337, dated Jun. 27, 2014 (4 pages).
United States Patent and Trademark Office, "Non-Final Office Action," issued in connection with U.S. Appl. No. 14/500,443, dated May 28, 2015, 15 pages.
United States Patent and Trademark Office, "Notice of Allowance," issued in connection with U.S. Appl. No. 14/500,443, dated Sep. 30, 2015, 20 pages.
Canadian Intellectual Property Office, "Notice of Allowance," issued in connection with Application No. 2,581,982, dated Jan. 14, 2013, 1 page.
European Patent Office, "Extended European Search Report," issued in connection with Application No. 05798935.2, dated May 3, 2012, 7 pages.
Mexican Patent Office, "Office Action," issued in connection with Application No. MX/a/2007/003680, dated Sep. 14, 2009, 6 pages.
United States Patent and Trademark Office, "Non-Final Office Action," issued in connection with U.S. Appl. No. 11/692,087, dated May 13, 2009, 11 pages.
United States Patent and Trademark Office, "Final Office Action," issued in connection with U.S. Appl. No. 12/967,415, dated Apr. 18, 2013, 8 pages.
United States Patent and Trademark Office, "Final Office Action," issued in connection with U.S. Appl. No. 12/967,415, dated Dec. 19, 2013, 9 pages.
United States Patent and Trademark Office, "Non-Final Office Action," issued in connection with U.S. Appl. No. 12/967,415, dated Jan. 3, 2013, 10 pages.
United States Patent and Trademark Office, "Non-Final Office Action," issued in connection with U.S. Appl. No. 12/967,415, dated Sep. 6, 2013, 8 pages.
United States Patent and Trademark Office, "Notice of Allowance," issued in connection with U.S. Appl. No. 12/967,415, dated Jun. 30, 2014, 7 pages.
United States Patent and Trademark Office, "Notice of Allowability," issued in connection with U.S. Appl. No. 12/967,415, dated Sep. 11, 2014, 4 pages.
IP Australia, "Patent Examination Report No. 2," issued in connection with Australian Patent Application No. 2013204919 dated Aug. 30, 2015, (2 pages).
Canadian Intellectual Property Office, "Examination Report," issued in connection with Canadian Patent Application No. 2,875,592, dated Mar. 30, 2015 (5 pages).
Patent Cooperation Treaty, "International Search Report," issued in connection with International Application No. PCT/US2014/022704, dated Jun. 25, 2014 (3 pages).
Patent Cooperation Treaty, "Written Opinion" issued in connection with International Application No. PCT/US2014/022704, dated Jun. 25, 2014 (5 pages).
Patent Cooperation Treaty, "Search Report," dated Oct. 31, 2006 in corresponding PCT application No. PCT/US05/34743 (4 pages).
Patent Cooperation Treaty, "Written Opinion" dated Oct. 31, 2006 in corresponding PCT application No. PCT/US05/34743 (7 pages).
United States Patent and Trademark Office, "Interview Summary," issued in connection with U.S. Appl. No. 11/692,087, dated Dec. 11, 2009 (3 pages).
United States Patent and Trademark Office, "Final Office Action," issued in connection with U.S. Appl. No. 13/828,702, dated Jan. 5, 2015, 12 pages.
United States Patent and Trademark Office, "Non-Final Office Action," issued in connection with U.S. Appl. No. 13/828,702, dated Jul. 23, 2014, 10 pages.
United States Patent and Trademark Office, "Notice of Allowance," issued in connection with U.S. Appl. No. 13/828,702, dated Jun. 11, 2015, 9 pages.
IP Australia, "Patent Examination Report No. 1," issued in connection with Australian Patent Application No. 2013204919, dated Aug. 27, 2014, 4 pages.
Canadian Intellectual Property Office, "Notice of Allowance," issued in connection with Application No. 2,875,592, dated Dec. 14, 2015, 1 page.
Patent Cooperation Treaty, "International Preliminary Report on Patentability," issued in connection with International Application No. PCT/US2014/022704, dated Sep. 15, 2015, 6 pages.
Canadian Intellectual Property Office, "Office Action," issued in connection with Canadian Patent Application No. 2,873,115, dated Dec. 18, 2014 (4 pages).
Patent Cooperation Treaty, "Search Report," issued in connection with PCT Application No. PCT/US2014/018921, dated Jun. 27, 2014 (5 pages).
Patent Cooperation Treaty, "Written Opinion," issued in connection with PCT Application No. PCT/ US2014/018921, dated Jun. 27, 2014 (6 pages).
Australian Government, IP Australia, "Patent Examination Report No. 1 ," issued in connection with Application No. 2013204263, dated Oct. 28, 2014 (3 pages).
Australian Government, IP Australia, "Notice of Acceptance," issued in connection with Application No. 2013204263, dated Mar. 17, 2015 (3 pages).
United States Patent and Trademark Office, "Non-Final Office Action," issued in connection with U.S. Appl. No. 13/782,895, dated Sep. 18, 2013, (22 pages).
United States Patent and Trademark Office, "Notice of Allowance," issued in connection with U.S. Appl. No. 13/782,895, dated Dec. 19, 2014 (5 pages).
United States Patent and Trademark Office. "Non-Final Office Action," issued in connection with U.S. Appl. No. 13/782,895 dated May 22, 2014 (18 pages).

(56) References Cited

OTHER PUBLICATIONS

United States Patent and Trademark Office, "Non-Final Office Action," issued in connection with U.S. Appl. No. 14/662,792, dated Jun. 30, 2015, 8 pages.
United States Patent and Trademark Office, "Notice of Allowance," issued in connection with U.S. Appl. No. 14/662,792, dated Dec. 10, 2015, 9 pages.
Canadian Intellectual Property Office, "Office Action," issued in connection with Canadian Patent Application No. 2,873,115, dated Jun. 8, 2015 (3 pages).
Patent Cooperation Treaty, "International Preliminary Report on Patentability," issued in connection with PCT Application No. PCT/US2014/018921, dated Sep. 1, 2015 (7 pages).
Australian Government. IP Australia. "Patent Examination Report No. 1," issued in connection with Australian Patent Application No. 2015200081 dated Aug. 20, 2015 (2 pages).
United States Patent and Trademark Office, "Non-Final Office Action," issued in connection with U.S. Appl. No. 14/796,584, dated Oct. 26, 2015, 6 pages.
United States Patent and Trademark Office, "Notice of Allowance," issued in connection with U.S. Appl. No. 14/796,584, dated Dec. 22, 2015, 7 pages.
IP Australia, "Patent Examination Report No. 1," issued in connection with Application No. 2013204911, dated Oct. 20, 2014, 4 pages.
IP Australia, "Notice of Acceptance," issued in connection with Application No. 2013204911, dated Jan. 15, 2015, 2 pages.
International Searching Authority, "Written Opnion," issued in connection with International Patent Application No. PCT/US2014/020337, dated Jun. 27, 2014 (4 pages).
International Searching Authority, "International Preliminary Report on Patentability," issued in connection with International Patent Application No. PCT/US2014/020337, dated Sep. 8, 2015 (5 pages).
Patent Cooperation Treaty, "International Preliminary Report on Patentability", dated Sep. 15, 2015, in connection with PCT/US2014/028131, (7 pages).
IP Australia, "Examination Report", issued in connection with Australian Patent Application No. 2013204937, dated Feb. 24, 2015 (5 pages).
International Searching Authority, "International Search Report and Written Opinion", issued in connection with corresponding International Application No. PCT/US2014/028131, dated Jul. 11, 2014 (14 pages).
United States Patent and Trademark Office, "Ex parte Quayle Action," issued in connection with U.S. Appl. No. 13/837,441, dated May 5, 2015, 7 pages.
United States Patent and Trademark Office, "Notice of Allowance," issued in connection with U.S. Appl. No. 13/837,441, dated Jul. 23, 2015, 5 pages.
United States Patent and Trademark Office, "Corrected Notice of Allowability," issued in connection with U.S. Appl. No. 13/837,441, dated Oct. 29, 2015, 2 pages.
Patent Cooperation Treaty, "Written Opinion," issued in connection with International Application No. PCT/US2014/021986, dated Jun. 27, 2014 (4 pages).
Patent Cooperation Treaty, "International Search Report," issued in connection with International Application No. PCT/US2014/021986, dated Jun. 27, 2014 (3 Pages).
Australian Government, IP Australia, "Patent Examination Report No. 1," issued in connection with Australian Patent Application No. 2013205025 dated Aug. 11, 2014 (5 pages).
United States Patent and Trademark Office, "Non-Final Office Action," issued in connection with U.S. Appl. No. 13/801,176, dated Apr. 9, 2015, 7 pages.
United States Patent and Trademark Office, "Notice of Allowance," issued in connection with U.S. Appl. No. 13/801,176, dated Aug. 12, 2015, 7 pages.

Patent Cooperation Treaty, "International Preliminary Report on Patentability," issued in connection with International Application No. PCT/US2014/021986, dated Sep. 15, 2015 (6 Pages).
International Searching Authority, "International Preliminary Report on Patentability", issued in connection with International Patent Application No. PCT/US2005/34743, dated Apr. 27, 2007 (8 pages).
United States Patent and Trademark Office, "Corrected Notice of Allowability," issued in connection with U.S. Appl. No. 14/313,414, dated Nov. 16, 2015, 4 pages.
Finding Your Way Around the TI-83+/84+ Graphing Calculator: Statistics 2, "Correlation Coefficient," [retrieved from http://mathbits.com/mathbits/tisection/statistics2/correlation.htm on Nov. 30, 2010], 3 pages.
Unpublished U.S. Appl. No. 09/076,517, filed May 12, 1998, 77 pages.
IP Australia, "Notice of Acceptance," issued in connection with Application No. 2015200081, dated Jan. 12, 2016, 2 pages.
IP Australia, "Notice of Acceptance," issued in connection with Australian Patent Application No. 2013204919, dated Jan. 11, 2016, (2 pages).
Canadian Intellectual Property Office, "Office Action," issued in connection with Application No. 2,875,356, dated Jan. 25, 2016, 5 pages.
Canadian Intellectual Property Office, "Office Action," issued in connection with Application No. 2,875,374, dated Jan. 18, 2016, 5 pages.
United States Patent and Trademark Office, "Notice of Allowance," issued in connection with U.S. Appl. No. 14/879,544, dated Mar. 3, 2016, 9 pages.
Puikkonen "Development of an Adaptive Equalization Algorithm Using Acoustic Energy Density", Brigham Young University, Apr. 21, 2009, 208 pages.
Handy et al., "Lessons Learned from Developing a Bluetooth Multiplayer-Game," 2nd International Conference on Pervasive Computing, Workshop on Gaming, [retrieved from internet, http://www.ipsi.fraunhofer.de/ambiente/pervasivegaming/papers/Handy_Pervasive2004.pdf] (pp. 7).
United States Patent and Trademark Office, "Restrictions Requirement", issued in connection with U.S. Appl. No. 13/718,878, dated Mar. 13, 2014, 6 pages. (Copy not provided as is a USPTO document).
United States Patent and Trademark Office, "Non-Final Office action", issued in connection with U.S. Appl. No. 13/718,878, dated Jul. 14, 2014, 30 pages. (Copy not provided as is a USPTO document).
United States Patent and Trademark Office, "Final Office action", issued in connection with U.S. Appl. No. 13/718,878, dated Jan. 6, 2015, 32 pages. (Copy not provided as is a USPTO document).
United States Patent and Trademark Office, "Notice of Allowance", issued in connection with U.S. Appl. No. 13/718,878, dated Sep. 25, 2015, 49 pages. (Copy not provided as is a USPTO document).
IP Australia, "Notice of Acceptance," issued in connection with Australian Patent Application No. 2015255256, dated Apr. 13, 2017, 3 pages.
IP Australia, "Patent Examination Report No. 1," issued in connection with Australian Patent Application No. 2015255256, dated Nov. 11, 2016, 2 pages.
State Intellectual Property Office of the People's Republic of China, "Office Action," issued in connection with Chinese Patent Application No. 201280070000.8, dated Oct. 21, 2016, 8 pages.
Japanese Intellectual Property Office, "Notice of Reasons for Rejection," issued in connection with Application No. 2014-547558, dated Nov. 24, 2015, 2 pages.
IP Australia, "Notice of Grant," issued in connection with Application No. 2012327192, dated Nov. 26, 2015, 1 page.
Canadian Intellectual Property Office, "Office Action," issued in connection with Application No. 2,859,560, dated Nov. 3, 2015, 5 pages.
IP Australia, "Notice of Acceptance," issued in connection with Application No. 2012327192, dated Jul. 29, 2015, 2 pages.

(56) References Cited

OTHER PUBLICATIONS

European Patent Office, "Extended European Search Report," issued in connection with Application No. 12859707.7, dated Jul. 6, 2015, 7 pages.
Doe, "Bringing Set Top Box Data to Life," ARF Audience Measurement Symposium 2.0, NYC, Jun. 26, 2007, 9 pages.
IP Australia, "Patent Examination Report No. 1 ," issued in connection with Application No. 2012327192, dated Aug. 6, 2014, 3 pages.
European Patent Office, "Communication pursuant to Rules 161(2) and 162 EPC," issued in connection with Application No. 12859707.7, dated Aug. 1, 2014, 3 pages.
Patent Cooperation Treaty, "International Preliminary Report on Patentability," issued in connection with Application No. PCT/US2012/070362, dated Jun. 24, 2014, 9 pages.
International Search Report and Written Opinion, issued by the International Searching Authority in connection with International application No. PCT/US2012/070362, dated Apr. 30, 2013, 8 pages.
The State Intellectual Property Office of China, "Third Office Action", issued in connection with Chinese Patent Application No. 201210175375.2, dated Aug. 18, 2015 (15 pages).
Patent Cooperation Treaty, "International Search Report," issued in connection with Application No. PCT/ US2015/043465, dated Nov. 13, 2015, 5 pages.
Patent Cooperation Treaty, "Written Opinion," issued in connection with Application No. PCT/ US2015/043465, dated Nov. 13, 2015, 4 pages.
International Bureau, "International Preliminary Report on Patentability," issued in connection with Patent Application No. PCT/US2015/043465, dated Feb. 17, 2017, 6 pages.
Patent Cooperation Treaty, "International Search Report," issued in connection with Application No. PCT/ US02/12333, dated Jul. 4, 2003, 2 pages.
State Intellectual Property Office of China, "Office Action," issued in connection with Chinese Application No. 201110288875.2, dated Oct. 30, 2013, and corresponding English translation, 8 pages.
Tsekeridou et al., "Content-Based Video Parsing and Indexing Based on Audio-Visual Interaction," IEEE Transactions on Circuits and Systems for Video Technology, vol. 11 No. 4, Apr. 2001, 14 pages.
Extended European Search Report, issued by the European Patent Office in connection with European Patent Application No. 11009958.7, dated Jul. 18, 2012, 10 pages.
"Communication Pursuant to Article 94(3) EPC," issued by the European Patent Office in connection with European Patent Application No. 11009958.7, dated Mar. 20, 2013, 4 pages.
Notice of Allowance, issued by the Korean Intellectual Property Office in connection with Korean Patent Application No. 10-2007-7005373, dated Dec. 24, 2012, 3 pages.
Notice of Allowance. issued by the Canadian Intellectual Property Office in connection with Canadian Patent Application No. 2576865 dated Oct. 2, 2012, 1 page.
Notice of Allowance, issued by the State Intellectual Property Office of China P.R. In connection with Chinese Patent Application No. 200580030202, dated Jun. 21, 2013, 5 pages.
Fourth Office Action, issued by the State Intellectual Property Office of China P.R. In connection with Chinese Patent Application No. 200580030202, dated Mar. 18, 2013, 6 pages.
IP Australia, "Notice of Acceptance," issued in connection with Australian Patent Application No. 2010201753, dated Apr. 17, 2012 (3 pages).
IP Australia, "Patent Examination Report," issued in connection with Australian Patent Application No. 2010219320, dated Jun. 20, 2012 (4 pages).
EPO, "Summons to Attend Oral Proceedings Pursuant to Rule 115(1) EPC," issued in connection with European Patent Application No. 05798239.9, dated Dec. 22, 2011 (3 pages).
EPO, "Communication Pursuant to Rule 62a(1) EPC and Rule 63(1) EPC," issued in connection with European Patent Application No. 11009958.7, dated Mar. 27, 2012 (3 pages).
KIPO, "Notice of Preliminary Rejection," issued in connection with Korean Patent Application No. 10-2007-7005373, dated May 30, 2012 (5 pages).
PCT, "Search Report," issued in connection with PCT Application No. PCT/US2003/030355, dated May 5, 2004 (6 pages).
PCT, " Written Opinion," issued in connection with PCT Application No. PCT/US2005/028106, dated Mar. 12, 2007 (5 pages).
PCT, "International Preliminary Report on Patentability," issued in connection with PCT Application No. PCT/US2005/028106, dated Mar. 27, 2007 (4 pages).
PCT, "International Preliminary Report on Patentability," issued in connection with PCT Application No. PCT/US2006/031960, dated Feb. 20, 2008 (5 pages).
Lu et al., "Content Analysis for Audio Classification and Segmentation," IEEE Transactions on Speech and Audio Processing, vol. 10, No. 7, Oct. 2002, (14 pages).
State Intellectual Property Office of China, "Rejection Decision," issued in connection with Chinese Patent Application No. 200580030202, dated Mar. 24, 2011 (9 pages).
European Patent Office, "Communication Pursuant to Article 94(3) EPC," issued in connection with European Application No. 05 798 239.9-220 dated Dec. 27, 2010 (4 pages).
Korean Intellectual Property Office, "Notice of Preliminary Rejection," issued in connection with Korean Patent Application No. 10-2007-7005373, dated Oct. 31, 2011.
IP Australia, "Examiner's Response," issued in connection with Australian Patent Application No. 2010201753, dated Mar. 23, 2011, (2 pages).
Canadian Intellectual Property Office, "Office Action," issued in connection with Canadian Patent Application No. 2,576,865, dated Jun. 17, 2011 (3 pages).
European Patent Office, "Communication Pursuant to Article 94(3) EPC," issued in connection with European Patent Application No. 05798239.9 dated Dec. 8, 2009 (5 pages).
Intellectual Property Office of New Zealand, "Examination Report," issued in connection with New Zealand Patent Application No. 553385, dated Nov. 18, 2009 (2 pages).
Mexican Patent Office, "Official Action," issued in connection with Mexican Patent Application Serial No. MX/a/2007/001734, dated Jul. 24, 2009, and an English Language Translation (5 pages).
State Intellectual Property Office of China, English Language Translation of the First Office Action in connection with the Chinese Patent Application Serial No. 200580030202, dated Jun. 5, 2009, (11 pages).
IP Australia, "Examiner's First Report," issued in connection with the Australian Patent Application Serial No. 2005273948, dated May 22, 2009 (2 pages).
Austrian Patent Office Service and Information Center, (TRF), "Written Opinion," issued in connection with Singaporean Patent Application Serial No. 200700990-5, dated Jun. 23, 2009 (4 pages).
Ministry of Economic Development of New Zealand, "Examination Report," issued in connection with New Zealand Patent Application Serial No. 553385, dated Oct. 17, 2008 (2 pages).
Canadian Intellectual Property Office (CIPO). "Office Action" issued in connection with Canadian Patent Application Serial No. 2,576,865, dated Mar. 29, 2010 (5 pages).
Intellectual Property Office of New Zealand, "Examination Report and Notice of Acceptance of Complete Specification," issued in connection with New Zealand Patent Application No. 553385, dated May 27, 2010 (2 pages).
IP Australia, "Notice of Acceptance," in connection with Patent Application No. 2006279518, dated May 28, 2010 (4 pages).
IP Australia, "Standard Patent Granted," issued in connection with Australian Patent No. 2006279518, dated Sep. 23, 2010 (1 page).
State Intellectual Property Office of China, "Second Office Action (with translation)," issued in connection with Chinese Patent Application No. 200680036510.8, dated Mar. 24, 2010 (5 pages).
State Intellectual Property Office of China, "Notification of Publication of Application," in connection with Chinese Application No. 200680036510.8, dated Oct. 17, 2008 (1 page).
State Intellectual Property Office of China, "First Office Action, (with translation)," in connection with Chinese Patent Application No. 200680036510.8, dated Jul. 10, 2009 (10 pages).

(56) References Cited

OTHER PUBLICATIONS

Patents Registry, Intellectual Property Department of Hong Kong, "Grant of Request for Registration and Grant," in connection with Application No. 09101551.0, dated Mar. 22, 2011 (4 pages).
State Intellectual Property Office of China, "Notice of Allowance," issued in connection with Chinese Patent Application No. 200680036510.8, dated Aug. 9, 2010 (4 pages).
Mexican Patent Office, "Office Action," issued in connection with Mexican Patent Application No. MX/a/2008/002317, dated Aug. 19, 2010 (2 pages).
IP Australia, "Notice of Acceptance," in connection with Australian Patent Application No. 2005273948, dated Jan. 20, 2010 (3 pages).
Andrieu et al., "Bayesian Blind Marginal Separation ofConvolutively Mixed Discrete Sources," Proceedings of the 1998 IEEE Signal Processing Society Workshop, Department of Engineering, Cambridge, UK, 1998 IEEE, (10 pages).
Rajon et al., "Bayesian approach to parameter estimation and interpolation of time-varying autoregressive process using the Gibbs sampler," IEE Proceedings: Vision, Image, and Signal Processing, Institution of Electrical Engineers, 1997, (8 pages).
European Patent Office, "Extended European Search Report," issued by the European Patent Office dated Dec. 1, 2009, in connection with European application No. 09013713.4-2221, (8 pages).
Thomas, William L., "Television Audience Research Technology, Today's Systems and Tomorrow's Challenges," Nielsen Media Research, Jun. 5, 1992 (4 pagees).
Vincent et al., "A Tentative Typology of Audio Source Separation Tasks," 41th International Symposium on Independent Component Analysis and Blind Signal Separation (ICA 2003), held in Nara, Japan, Apr. 2003 (6 pages).
Smith, Leslie S., "Using IIDs to Estimate Sound Source Direction," Proceedings of the Seventh International Conference on Simulation of Adaptive Behavior on from Animals to Animats, pp. 60-61, 2002 (2 pages).
The Peltarion Blog, Jul. 10, 2006 [Retrieved from the Internet on Mar. 11, 2009] Retrieved from the Internet: http//blog.peltarion.com/2006/07110/classifier-showdown (14 pages).
Logical Connective: Philosophy 103: Introduction to Logic Conjunction, Negation, and Disjunction, [Retrieved from the Internet on Mar. 11, 2009] Retrieved from the Internet: http://philosophy.lander.edu!logic/conjunct.html (5 pages).
Naive Bayes Classifier, Wikipedia entry as of Mar. 11, 2009 [Retrieved from the Internet on Mar. 11, 2009] (7 pages).
Naive Bayes Classifier, Wikipedia entry as of Jan. 11, 2008 [Retrieved from the Internet from Wikipedia history pages on Mar. 11, 2009] (7 pages).
Zimmerman, H., Fuzzy set applications in pattern recognition and data-analysis, 11th IAPR International conference on Pattern Recognition, Aug. 29, 1992 (81 pages).
Patent Cooperation Treaty, "International Preliminary Report on Patentability," issued by the International Searching Authority in connection with PCT application No. PCT/US2003/030355, dated Mar. 21, 2008 (5 pages).
Patent Cooperation Treaty, "International Search Report," issued by the International Searching Authority in connection with PCT application No. PCT/US2003/030355, dated May 5, 2004 (8 pages).
Patent Cooperation Treaty, "International Preliminary Examination Report," issued by the International Preliminary Examining Authority in connection with PCT application No. PCT/US2003/030370, dated Mar. 10, 2005 (3 pages).
Patent Cooperation Treaty, "International Search Report," issued by the International Searching Authority in connection with PCT application No. PCT/US2003/030370, dated Mar. 11, 2004 (1 page).
Patent Cooperation Treaty, "Written Opinion of the International Searching Authority," issued by the International Searching Authority in connection with PCT application No. PCT/US2003/030370, dated Nov. 15, 2004 (5 pages).
European Patent Office, "Extended European Search Report," issued in connection with European Patent Application No. 05798239.9, dated Sep. 9, 2008 (4 pages).
Patent Cooperation Treaty, "International Search Report," issued by the International Searching Authority in connection with PCT application No. PCT/US2006/031960, dated Feb. 21, 2007 (1 page).
Patent Cooperation Treaty, "Written Opinion of the International Searching Authority," issued by the International Searching Authority in connection with PCT application No. PCT/US2006/031960, dated Feb. 21, 2007 (3 pages).
Zhang, Harry "The Optimality of Naive Bayes," 2004, American Association for the Advancement of Artificial Intelligence, 2004 (6 Pages).
Domingos et al., "On the Optimality of the Simple Bayesian Classifier under Zero-One Loss,", Department ofInformation and Computer Science, University of California, California, Jul. 30, 1997, [retrieved from the Internet on Feb. 29, 2008]. Retrieved from the Internet: http://www.cs.washington.edu/homes/pedrod.mli97.ps.gz, (28 Pages).
Perez et al., "A Probalistic Framework for Recognizing Similar Actions using Spatio-Temporal Features," University of Oxford, (England), [retrieved from the Internet on Feb. 29, 2008]. Retrieved from the Internet: http://www.dcs.warwick.ac.uklbmvc2007/proceedings/CD-ROM/papers/paper-161.pdf, (10 Pages).
Elkan, Charles "Naive Bayesian Learning," Department of Computer Science, Harvard University, Cambridge, Massachusetts, Sep. 1997 (4 Pages).
Mitchell, Tom M. "Generative and Discriminative Classifiers: Naive Bayes and Logistic Regression," Sep. 21, 2006, [retrieved from the Internet on Feb. 29, 2008]. Retrieved from the Internet: http://www.cs.cmu.eduHom/mlbook/NBayesLogReg.pdf, (17 Pages).
Lang, Markus "Implementation of Naive Bayesian Classifiers in Java," Department of Zweibrucken, Kaiserslautern University of Applied Sciences, (Germany), [retrieved from the Internet on Feb. 29, 2008]. Retrieved from the Internet: http://www.iit.eduHpro356fD3/ipro/documents/naive-bayes.doc, (4 Pages).
Liang et al., "Learning Naive Bayes Tree for Conditional Probability Estimation," University of New Brunswick, (Canada), [retrieved from the Internet on Feb. 29, 2008]. Retrieved from the Internet: http://www.flydragontech.com/publications/2006/CAI06.pdf, (13 Pages).
Mozina et al., "Nomograms for Visualization ofNaive Bayesian Classifier," [retrieved from the Internet on Feb. 29, 2008]. Retrieved from the Internet: http://www.ailab.si/blaz/papers/2004-PKDD.pdf, (12 Pages).
Naive Bayes Classification, Lecture 3 [retrieved from the Internet on Feb. 29, 2008]. Retrieved from the Internet: http://www.cs.toronto.edu/-zemei/Courses?CS411/Lect?03bayes.pdf, (9 Pages).
Klein, "CS 188: Artificial Intelligence Fall2007: Lecture 23 Naive Bayes," University of Berkeley, California, Nov. 15, 2007, [retrieved from the Internet on Feb. 29, 2008]. Retrieved from the Internet: http://www.inst.eecs.berkeley.edu/cs188/fa07/sliders/FA07%20cs188%201ecture%2023%20--%20bayes%20(6PP).pdf, (6 Pages).
Learning Bayesian Networks: Naive and non-Naive Bayes, Oregon States University, Oregon, [retrieved from the Internet on Feb. 29, 2008]. Retrieved from the Internet: http://web.engr.oregonstate.edu/-tgd/classes/534/slides/part6.pdf, (18 Pages).
The Naive Bayes Classifier, Oregon States University, Oregon, [retrieved from the Internet on Feb. 29, 2008]. Retrieved from the Internet: http://web.engr.oregonstate.edu/-afern/classes/cs534/notes/Naivebayes-1 O.pdf, (19 Pages).
Bayesian Networks: Machine Learning A: 708.064 07W 1sst KU, [retrieved from the Internet on Feb. 29, 2008]. Retrieved from the Internet: http://www.igi.tugraz.at/lehre/MLA!WS07/slides3.pdf, (21 Pages).
The Peltarion Blog, Aug. 3, 2006 [retrieved from the Internet on Feb. 29, 2008]. Retrieved from the Internet: http:/I blog.peltarion.com/img/cs/cs1.png, (9 Pages).
Logical Connective: Philosophy 103 Introduction to Logic; Cojunction, Negation, and Disjunction, [retrieved from the Internet on Feb.

(56) References Cited

OTHER PUBLICATIONS 29, 2008]. Retrieved from the Internet: http://philosophy. lander. edu!logic/images/graphics/conjunct.jpg, (7 Pages).

Wikipedia, "Naive Bayes Classifier," Wikipedia, [retrieved from the Internet on Feb. 29, 2008]. Retrieved from the Internet: http://www.en.wikipedia.org/wiki/Naive bayes, (11 Pages).

Dai et al., "Transferring Naive Bayes Classifiers for Text Classification," 2007, 6 pages, Association for the Advancement of Artificial Intelligence.

State Intellectual Property Office of China, "Office Action," issued in connection with Chinese Application No. 201110288875.2, dated Jul. 18, 2014, and corresponding English translation, (6 pages).

The United States Patent and Trademark Office, Notice of Allowance dated Oct. 28, 2013 in connection with U.S. Appl. No. 13/341,575 (9 pages). Copy not provided as is a USPTO document.

The United States Patent and Trademark Office, Non-Final Office action dated Jul. 10, 2013 in connection with U.S. Appl. No. 13/341,575 (11 pages). Copy not provided as is a USPTO document.

The United States Patent and Trademark Office, Notice of Allowance dated Apr. 24, 2013 in connection with U.S. Appl. No. 12/831,870 (8 pages). Copy not provided as is a USPTO document.

The United States Patent and Trademark Office, Non-Final Office action dated Nov. 29, 2012 in connection with U.S. Appl. No. 12/831,870 (8 pages). Copy not provided as is a USPTO document.

The United States Patent and Trademark Office, Advisory Action dated Jan. 7, 2010 in connection with U.S. Appl. No. 11/388,262 (3 pages). Copy not provided as is a USPTO document.

United States Patent and Trademark Office, "Notice of Allowance," issued in connection with U.S. Appl. No. 12/725,018 dated Jun. 27, 2011 (7 pages). Copy not provided as is a USPTO document.

United States Patent and Trademark Office, "Notice of Allowance," issued in connection with U.S. Appl. No. 11/576,328, dated Apr. 7, 2010 (8 pages). Copy not provided as is a USPTO document.

United States Patent and Trademark Office, "Advisory Action Before the Filing an Appeal Brief," issued in connection with U.S. Appl. No. 11/388,555, dated Mar. 22, 2010 (3 pages). Copy not provided as is a USPTO document.

United States Patent and Trademark Office, "Notice of Allowance," issued in connection with U.S. Appl. No. 11/388,555, dated May 20, 2010 (4 pages). Copy not provided as is a USPTO document.

United States Patent and Trademark Office, "Non-Final Office Action," issued in connection with U.S. Appl. No. 11/388,262 dated Apr. 28, 2010 (11 pages). Copy not provided as is a USPTO document.

United States Patent and Trademark Office, "Interview Summary," issued in connection with U.S. Appl. No. 11/388,262 dated Sep. 28, 2010 (3 pages). Copy not provided as is a USPTO document.

United States Patent and Trademark Office, "Final Office Action," issued in connection with U.S. Appl. No. 11/388,262 dated Oct. 12, 2010 (11 pages). Copy not provided as is a USPTO document.

United States Patent and Trademark Office, "Notice of Panel Decision from Pre-Appeal Brief Review," issued in connection with U.S. Appl. No. 11/388,262 dated Feb. 28, 2011 (2 pages). Copy not provided as is a USPTO document.

United States Patent and Trademark Office, "Examiner's Answer to Appeal Brief," issued in connection with U.S. Appl. No. 11/388,262 dated Aug. 4, 2011 (20 pages). Copy not provided as is a USPTO document.

United States Patent and Trademark Office, "Notice of Allowance and Fee(s) Due," in connection with U.S. Appl. No. 11/672,706, dated Dec. 31, 2009 (16 pages). Copy not provided as is a USPTO document.

United States Patent and Trademark Office. "Final Office Action," issued in connection with U.S. Appl. No. 11/388,555, dated Dec. 8, 2009 (15 pages). Copy not provided as is a USPTO document.

United States Patent and Trademark Office, "Non-Final Office Action," issued in connection with U.S. Appl. No. 11/388,555, dated Mar. 31, 2009 (10 pages). Copy not provided as is a USPTO document.

United States Patent and Trademark Office, "Final Office Action," issued in connection with U.S. Appl. No. 11/388,262, dated Sep. 2, 2009 (13 pages). Copy not provided as is a USPTO document.

United States Patent and Trademark Office, "Non-Final Office Action," issued in connection with U.S. Appl. No. 11/672,706, dated Jul. 23, 2009 (8 pages). Copy not provided as is a USPTO document.

United States Patent and Trademark Office, "Non-Final Office Action," issued in connection with U.S. Appl. No. 11/576,328, dated Aug. 7, 2009 (11 pages). Copy not provided as is a USPTO document.

Non-Final Office Action issued by the United States Patent and Trademark Office dated Feb. 5, 2009, in connection with U.S. Appl. No. 11/576,328 (20 pages). Copy not provided as is a USPTO document.

Non-Final Office Action issued by the United States Patent and Trademark Office dated Mar. 5, 2009, in connection with U.S. Appl. No. 11/388,262 (22 pages). Copy not provided as is a USPTO document.

Non-Final Office Action issued by the United States Patent and Trademark Office dated Dec. 27, 2007, in connection with U.S. Appl. No. 11/388,555 (12 pages). Copy not provided as is a USPTO document.

Final Office Action issued by the United States Patent and Trademark Office dated Oct. 6, 2008, in connection with U.S. Appl. No. 11/388,555 (18 pages). Copy not provided as is a USPTO document.

Advisory Action issued by the United States Patent and Trademark Office dated Jan. 13, 2009, in connection with U.S. Appl. No. 11/388,555 (4 pages). Copy not provided as is a USPTO document.

United States Patent and Trademark Office, "Non-Final Office Action," issued in connection with U.S. Appl. No. 12/263,150, dated Jul. 18, 2011, 51 pages. Copy not provided as is a USPTO document.

United States Patent and Trademark Office, "Final Office Action," issued in connection with U.S. Appl. No. 12/263,150, dated Nov. 18, 2011, 28 pages. Copy not provided as is a USPTO document.

United States Patent and Trademark Office, "Non-Final Office Action," issued in connection with U.S. Appl. No. 12/263,150, dated Mar. 6, 2013, 37 pages. Copy not provided as is a USPTO document.

United States Patent and Trademark Office, "Final Office Action," issued in connection with U.S. Appl. No. 12/263,150, dated Jul. 25, 2013, 25 pages. Copy not provided as is a USPTO document.

United States Patent and Trademark Office, "Notice of Allowance and Fee(s) Due," issued in connection with U.S. Appl. No. 12/263,150, dated Dec. 10, 2013, 19 pages. Copy not provided as is a USPTO document.

United States Patent and Trademark Office, "Notice of Allowance and Fee(s) Due," issued in connection with U.S. Appl. No. 12/263,150, dated Mar. 31, 2014, 15 pages. Copy not provided as is a USPTO document.

IP Australia, "Notice of Acceptance", issued in connection with Australian Patent Application No. 2012203037, dated Jul. 30, 2014 (2 pages).

IP Australia, "Examination Report", issued in connection with Australian Patent Application No. 2013203338, dated Sep. 30, 2014 (3 pages).

The State Intellectual Property Office of China, "First Office Action", issued in connection with Chinese Patent Application No. 201210175375.2, dated May 12, 2014 (4 pages).

Canadian Intellectual Property Office, "Office Action", issued in connection with Canadian Patent Application No. 2,777,579, dated Mar. 10, 2014 (2 pages).

Notice of Reasons for Rejection, issued by the Japanese Intellectual Property Office in connection with Japanese Patent Application No. P2012-118947, dated Aug. 26, 2013, 4 pages.

Patent Examination Report No. 1, issued by Australian Intellectual Property Office in connection with Australian Patent Application No. 2012203037, dated May 23, 2013, 4 pages.

Extended European Search Report, issued by European Intellectual Property Office in connection with European Patent Application No. 12004179.3, dated Oct. 18, 2013, 7 pages.

(56) References Cited

OTHER PUBLICATIONS

European Patent Office, "Examination Report", issued in connection with European Patent Application No. 12004179.3, dated May 27, 2016 (6 pages).
United States Patent and Trademark Office, "Non-Final Office Action", issued in connection with U.S. Appl. No. 13/149,500, dated Oct. 25, 2012 (13 pages). Copy not provided as is a USPTO document.
United States Patent and Trademark Office, "Final Office Action", issued in connection with U.S. Appl. No. 13/149,500, dated May 21,2013 (14 pages). Copy not provided as is a Uspto document.
United States Patent and Trademark Office, "Notice of Allowance", issued in connection with U.S. Appl. No. 13/149,500, dated April 19, 2014 (11 pages). Copy not provided as is a Uspto document.
United States Patent and Trademark Office, "Notice of Allowance", issued in connection with U.S. Appl. No.. 13/149,500, dated Jul. 30, 2014 (18 pages). Copy not provided as is a Uspto document.
Canadian Intellectual Propety Office, "Office Action", issued in connection with Canadian Application No. 2,777,579, dated Apr. 23, 2015 (3 pages).
Chinese Intellectual Property Office, "2nd Office Action", issued in connection with Chinese Patent Application No. 201210175375.2, dated Jan. 6, 2015 (16 pages).

\* cited by examiner

US 9,924,224 B2

METHODS AND APPARATUS TO DETERMINE A STATE OF A MEDIA PRESENTATION DEVICE

RELATED APPLICATION

This patent claims the benefit of U.S. Provisional Application Ser. No. 62/142,771, entitled "Methods and Apparatus to Determine a State of a Media Presentation Device," which was filed on Apr. 3, 2015, and is hereby incorporated herein by reference in its entirety.

FIELD OF THE DISCLOSURE

This disclosure relates generally to market research, and, more particularly, to methods and apparatus to determine a state of a media presentation device.

BACKGROUND

Audience measurement systems may be used to identify content output by a media presentation device. For example, a metering device can be equipped with microphone(s) to identify program content emanating from a media presentation device, such as a television (TV). An audio signal captured by the microphone(s) is processed either to extract an embedded watermark from the audio signal or convert the audio signal to a signature for matching against signatures stored in a reference database. Audio watermarks are embedded in media program content prior to distribution of the media program content for consumption. Reference audio signature databases are created from broadcast or distributed media program content.

BRIEF DESCRIPTION OF THE DRAWINGS

FIG. 4 depicts an example filter weight distribution corresponding to filter weights that indicate a monitored media presentation device is turned on.

DETAILED DESCRIPTION

Figure 1:
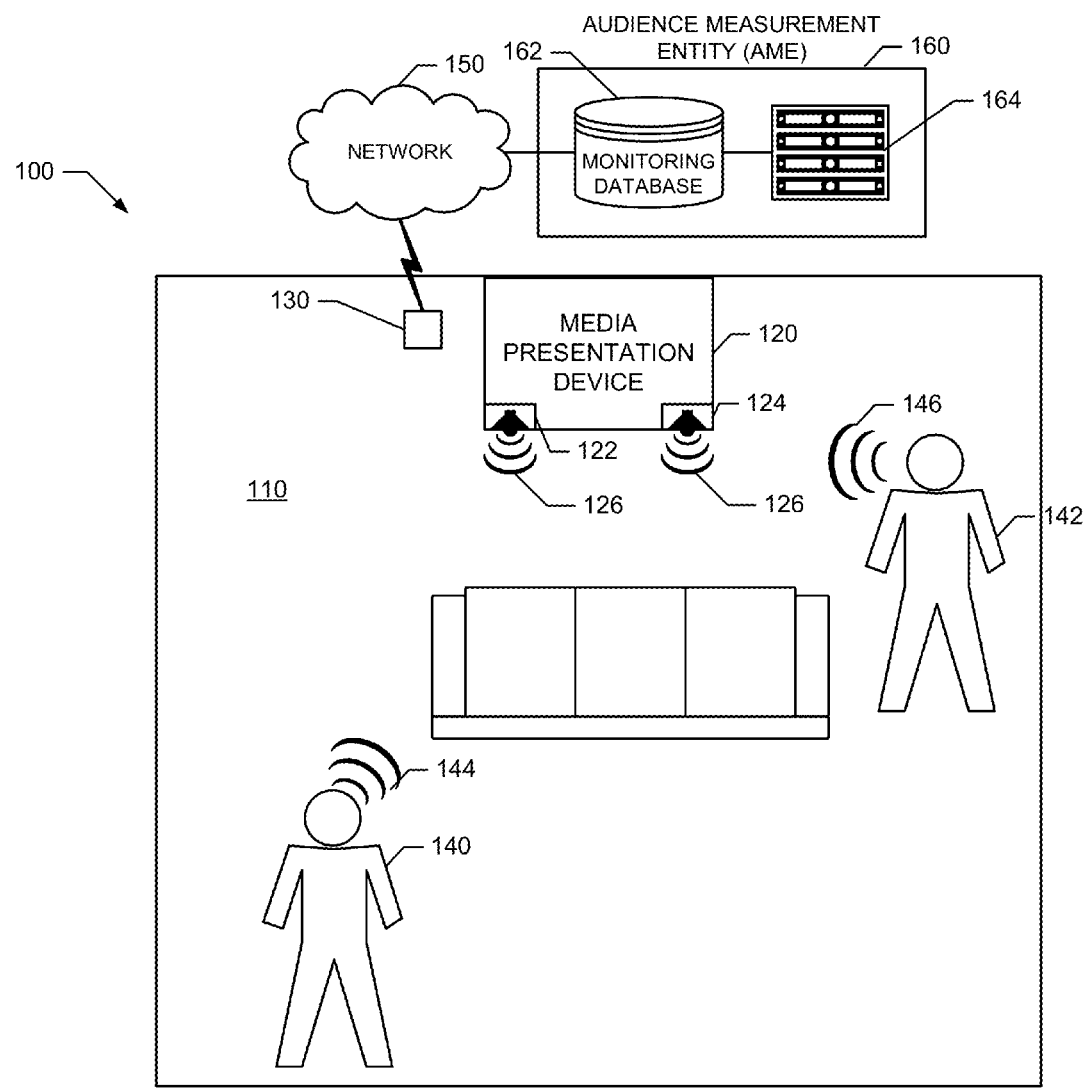
FIG. 1 depicts an example system including a meter to determine a state of a media presentation device.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In many microphone-based audience measurement environments, it is necessary to determine a source of audio signals being captured by a metering, monitoring, or measurement device (referred to herein as a "metering device or a meter" for illustrative brevity). If a source of captured audio signal is not properly identified, error is introduced into the audience measurement data that is generated based on the captured audio.

However, in some environments, a monitoring or metering device captures audio not only emanating from a media presentation device of interest, but also from other sources including ambient noise, speech signals from viewers talking to each other, etc. As disclosed herein, a source of the captured audio is identified to avoid erroneous audience measurement stemming from audio that is not emanating from the media presentation device of interest.

Examples disclosed herein facilitate audience measurement to determine whether audio being captured is emanating from the media presentation device of interest. When watermarks embedded in media are not successfully extracted, signatures computed from the microphone-captured audio may or may not represent the audio emanating from the media presentation device of interest. For example, the media presentation device of interest may be turned down or off, and the source of audio captured by the microphone can be any one of a plurality of other possible sources (e.g., people talking, other equipment in the room, ambient noise, etc.). In some such cases, it is possible to obtain false matches for program signature information when monitoring signatures generated by a metering or monitoring device are compared against a large number of reference signatures in a reference database. Certain examples confirm the media presentation device as source by analyzing the audio signals captured by the metering device.

Examples disclosed herein facilitate reducing instances of false matching by distinguishing audio emanating from the media presentation device of interest from audio generated by other potential sources. For example, disclosed examples facilitate identifying the media presentation device of interest as the source of the detected audio by analyzing the audio captured by the metering device to determine whether the media presentation device of interest is 1) turned on or 2) turned down or off.

Certain examples determine whether the media presentation device of interest is 1) turned on or 2) turned down or off by determining whether or not the detected audio matches a characteristic of audio previously detected from the media presentation device. If the detected audio matches a characteristic of audio previously detected from the media presentation device, then the media presentation device is inferred to be turned on. However, if the detected audio does not match a characteristic of audio previously detected from the media presentation device, then the media presentation device is inferred to be turned down or turned off.

When metering devices incorrectly credit exposure minutes, one or more household tuning estimates and/or projections may be over-reported and/or otherwise inflated. Additionally, attempted detection of watermarks and/or other codes by metering devices can return false positives and/or erroneous data if ambient noise interferes with proper capture and analysis of audio information from a media presentation device of interest. Example methods, apparatus, systems and/or articles of manufacture disclosed herein distinguish instances of ambient sound to be ignored from instances of audio from a media presentation device of interest that are to be monitored.

Examples disclosed herein provide methods of determining a state of a media presentation device. Disclosed example methods include generating a first set of weighted coefficients based on first audio received by first and second microphones at a first time. Disclosed example methods include generating a second set of weighted coefficients based on second audio received by the first and second microphones at a second time after the first time. Disclosed example methods include comparing the first set of coefficients and the second set of coefficients to generate a similarity value. Disclosed example methods include, when the similarity value satisfies a first threshold, determining that the media presentation device is in a first state. Disclosed example methods include, when the similarity value does not satisfy the first threshold, determining that the media presentation device is in a second state. Disclosed example methods include controlling a metering device based on the state of the media presentation device.

Examples disclosed herein provide tangible computer readable storage media having instruction that, when executed, cause a machine to generate a first set of weighted coefficients based on first audio received by first and second microphones at a first time. Disclosed example computer readable storage media have instructions that, when executed, further cause the machine to generate a second set of weighted coefficients based on second audio received by the first and second microphones at a second time after the first time. Disclosed example computer readable storage media have instructions that, when executed, further cause the machine to compare the first set of coefficients and the second set of coefficients to generate a similarity value. Disclosed example computer readable storage media have instructions that, when executed, further cause the machine to, when the similarity value satisfies a first threshold, determine that the media presentation device is in a first state. Disclosed example computer readable storage media have instructions that, when executed, further cause the machine to, when the similarity value does not satisfy the first threshold, determine that the media presentation device is in a second state. Disclosed example computer readable storage media have instructions that, when executed, further cause the machine to control a metering device based on the state of the media presentation device.

Examples disclosed herein provide apparatus including a metering device including a programmed processor. Disclosed example apparatus include the processor programmed to generate a first set of weighted coefficients based on first audio received by first and second microphones at a first time. Disclosed example apparatus include the processor programmed to generate a second set of weighted coefficients based on second audio received by the first and second microphones at a second time after the first time. Disclosed example apparatus include the processor programmed to compare the first set of coefficients and the second set of coefficients to generate a similarity value. Disclosed example apparatus include the processor programmed to, when the similarity value satisfies a first threshold, determine that the media presentation device is in a first state. Disclosed example apparatus include the processor programmed to, when the similarity value does not satisfy the first threshold, determine that the media presentation device is in a second state. Disclosed example apparatus include the processor programmed to control a metering device based on the state of the media presentation device.

Examples disclosed herein provide methods of determining a state of a media presentation device. Disclosed example methods include generating a first set of weighted coefficients based on first audio received by first and second microphones at a first time. Disclosed example methods include generating a second set of weighted coefficients based on second audio received by the first and second microphones at a second time after the first time. Disclosed example methods include calculating a dot product between the first set of coefficients and the second set of coefficients. Disclosed example methods include, when the calculated dot product satisfies a threshold, determining that the media presentation device is in a first state (e.g., turned on or activated, etc.). Disclosed example methods include, when the calculated dot product does not satisfy the threshold, determining that the media presentation device is in a second state (e.g., turned off or powered down, etc.).

Examples disclosed herein provide tangible computer readable storage media having instruction that, when executed, cause a machine to generate a first set of weighted coefficients based on first audio received by first and second microphones at a first time. Disclosed example computer readable storage media have instructions that, when executed, further cause the machine to generate a second set of weighted coefficients based on second audio received by the first and second microphones at a second time after the first time. Disclosed example computer readable storage media have instructions that, when executed, further cause the machine to calculate a dot product between the first set of coefficients and the second set of coefficients. Disclosed example computer readable storage media have instructions that, when executed, further cause the machine to, when the calculated dot product satisfies a threshold, determine that the media presentation device is in a first state. Disclosed example computer readable storage media have instructions that, when executed, further cause the machine to, when the calculated dot product does not satisfy the threshold, determine that the media presentation device is in a second state.

Examples disclosed herein provide apparatus including a metering device. Disclosed example metering devices are to generate a first set of weighted coefficients based on first audio received by first and second microphones at a first time. Disclosed example metering devices are to generate a second set of weighted coefficients based on second audio received by the first and second microphones at a second time after the first time. Disclosed example metering devices are to calculate a dot product between the first set of coefficients and the second set of coefficients. Disclosed example metering devices are to, when the calculated dot product satisfies a threshold, determine that the media presentation device is in a first state. Disclosed example metering devices are to, when the calculated dot product does not satisfy the threshold, determine that the media presentation device is in a second state.

Examples disclosed herein provide methods of determining a source location for an audio signal. Disclosed example methods include processing a captured audio signal to generate a first set of weighted coefficients characterizing the captured audio signal. Disclosed example methods include comparing the first set of weighted coefficients to a second set of weighted coefficients representing a reference audio signal originating from a first location to generate a similarity value. Disclosed example methods include, when the similarity value satisfies a comparison threshold, identifying a source location of the captured audio signal as the first location. Disclosed example methods include, when the similarity value does not satisfy the comparison threshold, identifying the source location of the captured audio signal as a second location.

Examples disclosed herein provide a metering device including a processor particularly programmed to at least determine a source location for an audio signal by processing a captured audio signal to generate a first set of weighted coefficients characterizing the captured audio signal. The processor of the disclosed example metering device is programmed to at least determine a source location for an audio signal by comparing the first set of weighted coefficients to a second set of weighted coefficients representing a reference audio signal originating from a first location to generate a similarity value. The processor of the disclosed example metering device is programmed to at least determine a source location for an audio signal by, when the similarity value satisfies a comparison threshold, identifying a source location of the captured audio signal as the first location. The processor of the disclosed example metering device is programmed to at least determine a source location for an audio signal by, when the similarity value does not satisfy the comparison threshold, identifying the source location of the captured audio signal as a second location.

Examples disclosed herein include example systems and methods for determining whether or not the audio captured by a monitoring device is from a media presentation device of interest when measuring audience member exposure to media. In the examples disclosed herein, two microphones are separated by a fixed distance to monitor the audio present in a room. Audio emanating from different locations within the room create audio signals detected by the microphones that are time delayed with respect to each other and have different multi-path interference effects that are controlled by room acoustics as well as audio source location. In the examples disclosed herein, the differences between the audio signals are analyzed by an adaptive equalization algorithm using a finite impulse response (FIR) filter. The example filter taps or coefficients generated by applying the FIR filter constitute a feature vector (e.g., a set of coefficients) that characterizes the audio source (e.g., an identity and/or location of the audio source, etc.). In the examples disclosed herein, the set of coefficients obtained while the media presentation device is ON is used as a vector to uniquely identify future audio signals from the media presentation device as well as to reject audio signals from other sources. An example baseline (e.g., reference) vector is generated during an interval in which the audio from the media presentation device is confirmed by the successful extraction of watermarks embedded in the media presented by the media presentation device, for example.

Example Monitoring and Determination Systems

FIG. 1 depicts an example system 100, depicted in an example room 110 having a media presentation device 120 (e.g., a television, other display or monitor, etc.) including speakers 122, 124 providing audio 126 in the room 110. While the example of FIG. 1 depicts a typical room 110 in a household, the room 110 can be any space, public or private, including a home, restaurant, bar, vehicle, bus, boat, etc. The example system 100 includes an example metering device 130 including a pair of microphones 132 and 134, a source detector 136, a decoder 138, and a creditor 139.

The example source detector 136 of the metering device 130 determines a state of the example media presentation device 120. The metering device 130 of the illustrated example is disposed on or near the media presentation device 120 and may be adapted to perform one or more of a plurality of metering methods (e.g., channel detection, watermark detection, collecting signatures and/or codes, etc.) to collect data concerning the media exposure of the metering device 130, and thus, the media exposure of one or more audience member(s) 140, 142 with respect to the media presentation device 120.

Depending on the type(s) of metering that the metering device 130 is adapted to perform, the metering device 130 may be physically coupled to the media presentation device 120 or may instead be configured to capture signals emitted externally by the media presentation device 120 such that direct physical coupling to the media presentation device 120 is not required. For instance, in this example, the metering device 130 is not physically or electronically coupled to the monitored media presentation device 120. Instead, the metering device 130 is provided with at least one audio sensor, such as, for example, a microphone, to capture audio data regarding in-home media exposure for the audience member(s) 140, 142. Similarly, the example metering device 130 is configured to perform one or more of a plurality of metering methods (e.g., collecting watermarks, signatures and/or codes, etc.) on the collected audio to enable identification of the media to which the audience members 140, 142.

Figure 2:
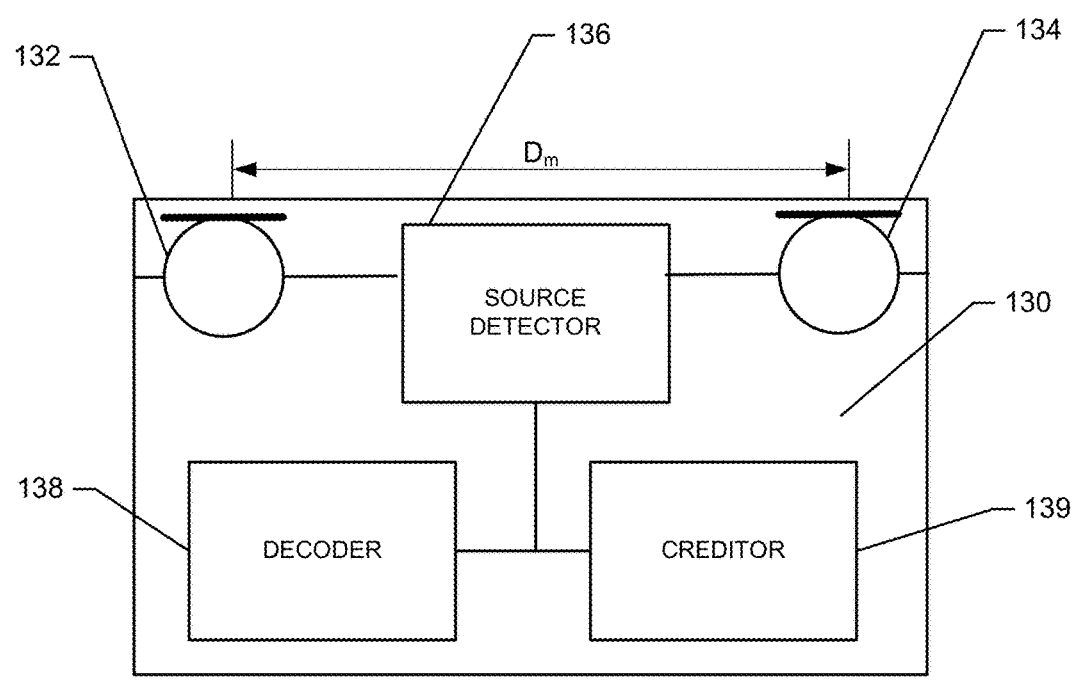
FIG. 2 shows an example implementation of a metering device such as the meter of FIG. 1.

As shown in more detail in the example of FIG. 2, the metering device 130 is provided with two example microphones 132 and 134, separated by a distance $D_m$, to record an audio signal 126 from the media presentation device 120. The example media presentation device 120 (e.g., a television set) has two speakers 122 and 124. Both speakers 122 and 124 reproduce or emit the audio signal 126 that is sensed by the microphones 132 and 134. In a typical room 110, multiple reflections may occur and the resulting audio signal 126 sensed by microphones 132 and 134 represents the combined effect of a direct wave and these reflections. Similarly, audience members 140, 142 talking to each in the room 110 other can create audio signals 144, 146 that are sensed by the microphones 132 and 134, as direct waves and/or as reflections.

In order to identify a single audio signal for metering, the example source detector 136 uses an algorithm, such as an adaptive least mean square algorithm, to construct a finite impulse response (FIR) filter that attempts to convert the audio (e.g., the audio signal 126, 144, and/or 146) captured by the first microphone 132 to a new synthetic signal (also referred to herein as a filtered audio signal) that is as close as possible, in a least mean squared sense, to the audio captured by the second microphone 134. Coefficients or "filter taps" of the corresponding adaptive filter depend on, for example, a location of the audio/media source (e.g., the media presentation device 120, the audience members 140, 142, etc.) of audio (e.g., the audio signal 126, 144, and/or 146, etc.) within the room 110 (e.g., assuming there is a single source). For example, a media presentation device 120 (e.g., a television set, etc.) equipped with two or more speakers (e.g., the speakers 122, 124, etc.) is considered to be a single source such that substantially the same audio waveform emanates from the speakers 122, 124 connected to the media presentation device 120). Coefficients or "filter taps" of the corresponding adaptive filter also depend on, for example, a separation between the microphones ($D_m$). Coefficients or "filter taps" of the corresponding adaptive filter also depend on, for example, acoustic characteristics of the room 110 determined by walls and/or other objects in the room 110 (e.g., devices, furniture, etc.). The source detector 136 assumes microphone separation and acoustic characteristics are constant for the coefficients that characterize the audio source.

As described further below, an adaptive algorithm subtracts the filtered version of the audio signal 126 received by the microphone 132 from the audio signal 126 received by the microphone 134. An adaptive filter generates the filter taps or coefficients used in the adaptive algorithm to yield information about similarity (or lack thereof) between the audio signals received by the microphones 132, 134, wherein the signal from the microphone 132 is delayed and filtered and the signal from the microphone 134 is not. Once the audio has been processed, the audio (e.g., audio signal 126, 144, 146, etc.) can be analyzed to determine a likely source of that audio and its associated status.

The example metering device 130 includes a decoder 138 and a creditor 139 in addition to the source detector 136 and microphones 132, 134. The decoder 138 receives and decodes audio received by the microphones 132 and 134 to extract a watermark and/or other code from the received audio. The decoder 138 works with the source detector 136 to determine whether or not the received audio is associated with the media presentation device 120 or from other ambient sound sources, such as audience members 140, 142, audio from another device, etc. If the decoder 138 identifies a valid watermark, for example, then the creditor 139 captures an identification of the media exposure and/or other audience measurement data based on the decoded watermark, code, etc. In some examples, the watermark is associated with a score (e.g., a reliability score) indicating a strength of or confidence in the decoded watermark. In some examples, a volume analysis is done in conjunction with the watermark identification to confirm that the watermark has been generated by a nearby monitored source instead of from a source that is farther away (e.g., spillover). In some examples, a signature and/or other code can be computed from the audio instead of or in addition to the watermark (e.g., when a watermark is not identified in the audio, etc.). The creditor 139 may also assign a location identifier, timestamp, etc., to the decoded data.

In certain examples, a home processing system (not shown) may be in communication with the meter 130 to collect media/audience exposure data (e.g., watermark, signature, location, timestamp, etc.) from the metering device 130 for further analysis, relay, storage, etc. As shown in the example of FIG. 1, data gathered by the meter 130 (e.g., watermark, signature, location, timestamp, etc.) can be relayed (e.g., directly or via the home processing system, etc.) via a network 150 to an audience measurement entity (AME) 160, such as a data collection facility of a metering entity (e.g., The Nielsen Company (US), LLC) for further tracking, analysis, storage, reporting, etc. Data can be relayed to the AME 160 via the network 150 (e.g., the Internet, a local area network, a wide area network, a cellular network, etc.) via wired and/or wireless connections (e.g., a cable/DSL/satellite modem, a cell tower, etc.).

In the illustrated example of FIG. 1, the AME 160 includes a monitoring database 162 in which to store the information from the monitored room 110 and a server 164 to analyze data aggregated in the monitoring database 162. The example AME 160 may process and/or store data received from other metering device(s) (not shown) in addition to the metering device 130 such that a plurality of audience members can be monitored and evaluated. In another example, multiple servers and/or databases may be employed as desired.

For example, the example server 164 collects the media exposure data from the meter 130 and stores the collected media exposure data in the example monitoring database 162. The example server 164 processes the collected media exposure data by comparing the codes, metadata, and/or signatures in the collected media exposure data to reference codes and/or signatures in a reference database to identify the media and/or station(s) that transmit the media. Examples to process the codes and/or signatures in the collected media exposure data are described in U.S. patent application Ser. No. 14/473,670, filed on Aug. 29, 2014, which is hereby incorporated herein by reference in its entirety. The example server 164 awards media exposure credits to media identified in the collected media exposure data, for example. In some examples, the media exposure credits are associated with demographic information corresponding to the audience member 140, 142 and/or type of audience member 140, 142 associated with the meter 130 that collected the media exposure data.

Figure 3:
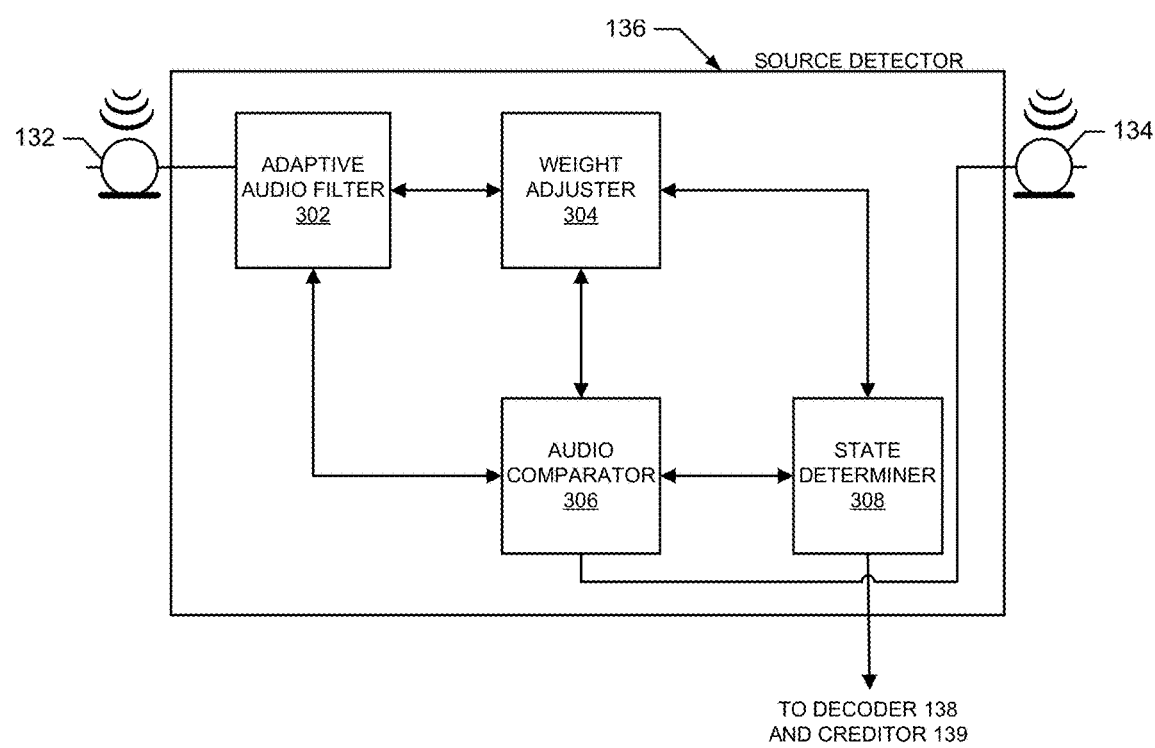
FIG. 3 illustrates an example implementation of a source detector such as the source detector of FIG. 2.

FIG. 3 illustrates an example implementation of the example source detector 136 of FIG. 2. In the illustrated example of FIG. 3, the example source detector 136 includes an adaptive audio filter 302, a weight adjuster 304, an audio comparator 306, and a state determiner 308. The example adaptive audio filter 302 samples audio received by the first microphone 132 at a specified sampling rate. In some examples, the adaptive audio filter 302 uses a 48 kHz sampling rate and uses 512 filter taps or weights (e.g., with values starting at zero and increasing based on signal delay). In such examples, the 512 filter taps or weights correspond to a maximum time delay of 10.66 milliseconds (1/48000 second per sample×512 samples). Because the microphones 132, 134 are close to one another (e.g., distance $D_m$) relative to a distance between the meter 130 and the potential audio sources 120, 140, 142, a delay of the audio signal 126 is below a maximum time delay value (e.g., 10.66 milliseconds). In some examples, other sampling rates, such as 24 kHz, may be used. In such examples, the filter weights used by the adaptive audio filter 302 become relatively constant values in, for example, less than a second from the start of the detected audio processing.

The set of weights (e.g., $\{W_m, m=0, 1, \ldots M-1\}$, also referred to as a feature vector) generated by the weight adjuster 304 characterizes a particular source of audio. In some examples, filter weights are modified and/or generated by the weight adjuster 304 based on feedback from the audio comparator 306 and/or other external input regarding the audio signal 126.

The audio comparator 306 analyzes the filtered audio signal provided by the adaptive audio filter 302 from the microphone 132 and compares it to the unfiltered audio signal input from the microphone 134. An error signal, used to impact the set of filter coefficients, can be also generated by the audio comparator 306 based on the comparison. If the audio comparator 306 matches the filtered and unfiltered signals and determines that the filtered audio detected by the first microphone 132 is substantially the same as the unfiltered audio detected by the second microphone 134, the error signal decreases to a low value. If, however, the filtered audio from the first microphone 132 is distinct from the unfiltered audio from the second microphone 134, the error signal increases in value. An increase in the error signal can trigger a re-calculation of the filter weight coefficients by the adaptive audio filter 302 to help ensure that the filtered audio from the microphone 132 matches the unfiltered audio from the microphone 134 and properly characterizes the audio source. The coefficients characterizing that audio source can then be compared to a reference to determine whether the audio source is the media presentation device 120 or is some other source of audio (e.g., people 140, 142 talking, ambient noise, another device emitting sound in the same room and/or another room, etc.).

In the illustrated example of FIG. 3, the adaptive audio filter 302 and/or the audio comparator 306 examines the filter coefficient distribution to help ensure that the filter taps or weights generated by the weight adjuster 304 have a decay characteristic (e.g., in which coefficient weights "decay" or reduce to zero over time). In the illustrated example, audio received by the second microphone 134 is delayed relative to the audio received by the first microphone 132 when the media presentation device 120 is the source of audio (e.g., the audio 126 of FIG. 1) because the first microphone 132 is relatively closer (in the example of FIG. 1) to the media presentation device 120 than the second microphone 134. Phrased differently, a relative delay between audio detected by the first and second microphones 132, 134 is dependent on the location of the meter 130 relative to the media presentation device 120. In some examples, the relative delay is based is also based on multiple sound wave paths in a room (e.g., the room 110 of FIG. 1) due to walls and other objects that contribute to acoustic reflections.

The example weight adjuster 304 generates and/or updates a set of filter coefficients having a magnitude that exponentially decreases as the index increases (e.g., a decay characteristic). An example filter weight distribution corresponding to filter weights that indicate that measured audio matches characteristics of audio emitted by the monitored presentation device 120, and, therefore, indicate that the monitored media presentation device 120 is turned on is shown in FIG. 4.

Figure 4:
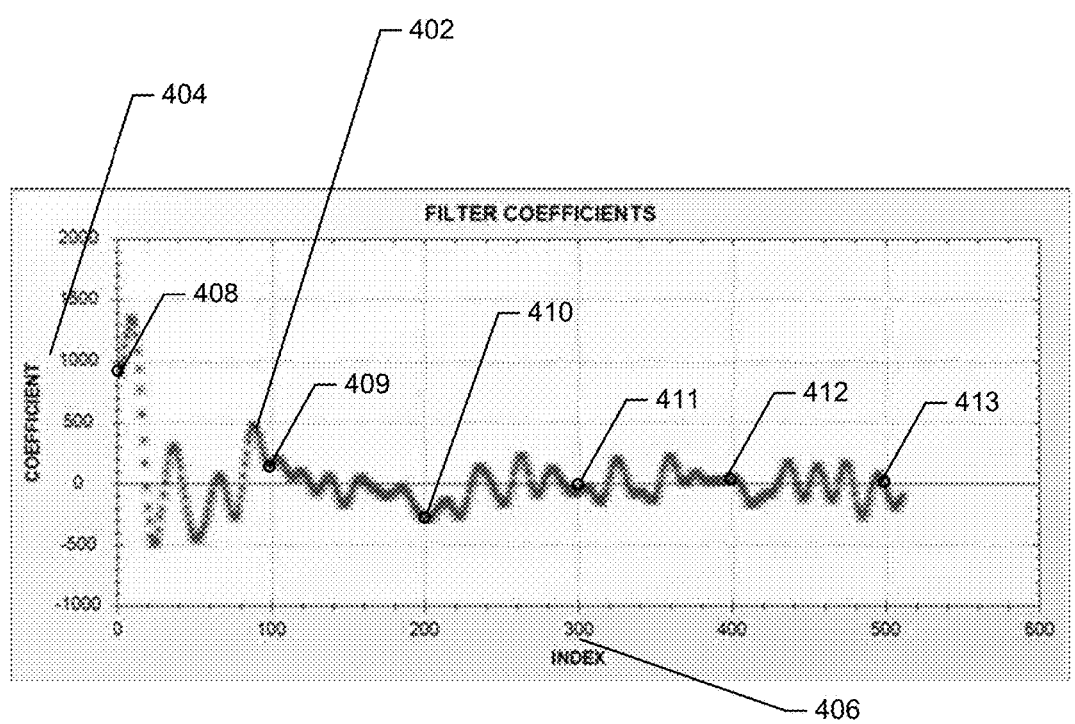

As shown in the example of FIG. 4, an example filter weight distribution 402 includes a plot of a plurality of filter weight coefficients 404 along an index 406, such as time (e.g., milliseconds), sample, etc. Individual weights 408-413 along the distribution form the set of filter coefficients used as a feature vector to represent the audio and calculate similarity between the audio signal and a reference vector.

The example audio comparator 306 of FIG. 3 calculates a signal error between the audio signal received by the first microphone 132 and then filtered and the audio signal received by the second microphone 134. As described above, if the audio comparator 306 matches the filtered and unfiltered signals and determines that the filtered audio detected by the first microphone 132 is substantially the same as to the unfiltered audio detected by the second microphone 134, the error signal has a low value (e.g., close to zero), and the associated weight coefficients can be used for analysis. If, however, the filtered audio from the first microphone 132 is distinct from the unfiltered audio from the second microphone 134, the error signal has a high value (e.g., one), and associated weight coefficients may be unsuitable for analysis. The example weight adjuster 304 adjusts and/or recalculates the weighted coefficients generated by the adaptive audio filter 302 based on the error signal till the filtered and unfiltered signals match and can then be compared to a reference to determine whether the monitored presentation device 120 is the source of the detected audio (and is therefore inferred to be "on" or "off", for example).

For example, filter weight coefficients are determined by an echo cancellation algorithm, described further below with respect to FIG. 6, so that, if the microphone 132 output is filtered using these coefficients and added to the microphone 134 signal, the net result is a very low energy audio output. Under ideal conditions, signals from 132 (filtered) and 134 (unfiltered) should perfectly cancel one another. In reality, however, the difference between filtered and unfiltered microphone inputs should be close to zero if the signals from 132 and 134 are both indicative of audio from the media presentation device 120.

In an example, suppose a difference in signals between microphone 132 and microphone 134 is a constant delay equivalent to ten samples. In this example, an FIR filter includes a single high value at a tenth coefficient and remaining filter coefficients are zero. However, room acoustics may complicate the filter coefficient analysis (e.g., remaining filter coefficients may be low but not exactly zero). Thus, in such an example, results include a primary audio "beam" with a delay of ten samples when measured at microphone 132 relative to microphone 134. The primary beam provides a high value coefficient at index 10 (e.g., corresponding to the delay of ten samples) followed by several smaller coefficients at indexes 11, 12, etc.

After the inputs from microphones 132 and 134 have been compared to reconcile the audio and generate the set of filter coefficients, the example audio comparator 306 provides the set of filter coefficients to the example state determiner 308. The state determiner 308 compares the set of filtered coefficients associated with the received audio signal 126 to a stored representation (e.g., a reference set of filter coefficients) of a reference signal indicating that the media presentation device 120 is turned on. If the received audio signal 126 matches or closely approximates characteristics of the reference signal (e.g., based on a comparison of the coefficient sets resulting in generation of a similarity value), then the state determiner 308 infers that the media presentation device 120 is turned on and outputting the audio 126. That is, characteristics of the audio signal 126, as identified by its set of filter coefficients, indicate a location of source for the audio signal 126 that matches a predetermined or "known" location of the media presentation device 120 as indicated by the reference set of filter coefficients.

Otherwise, the state determiner 308 infers that the media presentation device 120 is turned off or is otherwise not outputting detectable audio (e.g., is muted, the volume is turned down past a detectable threshold, etc.). Thus, a source of the audio detected by the microphones 132, 134 is other than the media presentation device 120. In some examples, as described further below, a mathematical operation such as a dot product determines a similarity of characteristics between the weight coefficients of the detected audio and reference coefficients. In some examples, reference coefficients can be recalculated by the weight adjuster 304 to accommodate a re-positioning of the media presentation device 120, an introduction of a new audio source in the room 110, etc. Recalculation or recalibration of reference coefficients can be based on one or more factors such as a time period without detecting audio having similar coefficients to the reference, identification of a valid watermark having a high reliability score, passage of a defined period of time (e.g., based on statistical analysis of prior media exposure data, household characteristic, etc.), etc.

When the meter 130 is extracting audio watermarks embedded in the detected audio, the state determiner 308 infers that the media presentation device 120 is likely the source (or a significant contributor) of the detected audio. As mentioned above, periodically and/or at certain defined times (e.g., as preset in the source detector 136, based on accuracy of watermark detection, based on quality of feedback, etc.), the example state determiner 308 stores filter coefficients generated by the example adaptive audio filter 302 and weight adjuster 304 during respective intervals as baseline (e.g., reference) filter coefficients $\{W_{m1}, m=0, 1, \ldots M-1\}$.

In some examples, if the state determiner 308 determines that the baseline filter coefficients generated by the weight adjuster 304 do not exhibit a decay characteristic (e.g., decreasing as the index increases), the example adapter audio filter 302 and the example audio comparator 306 interchange the audio signals received by the first and second microphones 132 and 134 (e.g., so that now the signal received at the second microphone 134 is filtered and the signal received at the first microphone 132 remains unfiltered) and rerun the adaptation algorithm to obtain a more suitable set of baseline coefficients that exhibit a decay characteristic. The signals are interchanged to correct an assumption in relative position and delay between the media presentation device 120 and the microphones 132 and 134. For example, the filter coefficients generated by the weight adjuster 304 may not exhibit a decay characteristic when the signal from microphone 132 is processed relative to the signal from microphone 134 because the relative positions of the microphones 132, 134 with respect to the media presentation device 120 are such that audio received by the first microphone 132 is delayed relative to audio received by the second microphone 134 (rather than the initial assumption that audio received from microphone 134 is delayed with respect to audio received by microphone 132).

Figure 5:
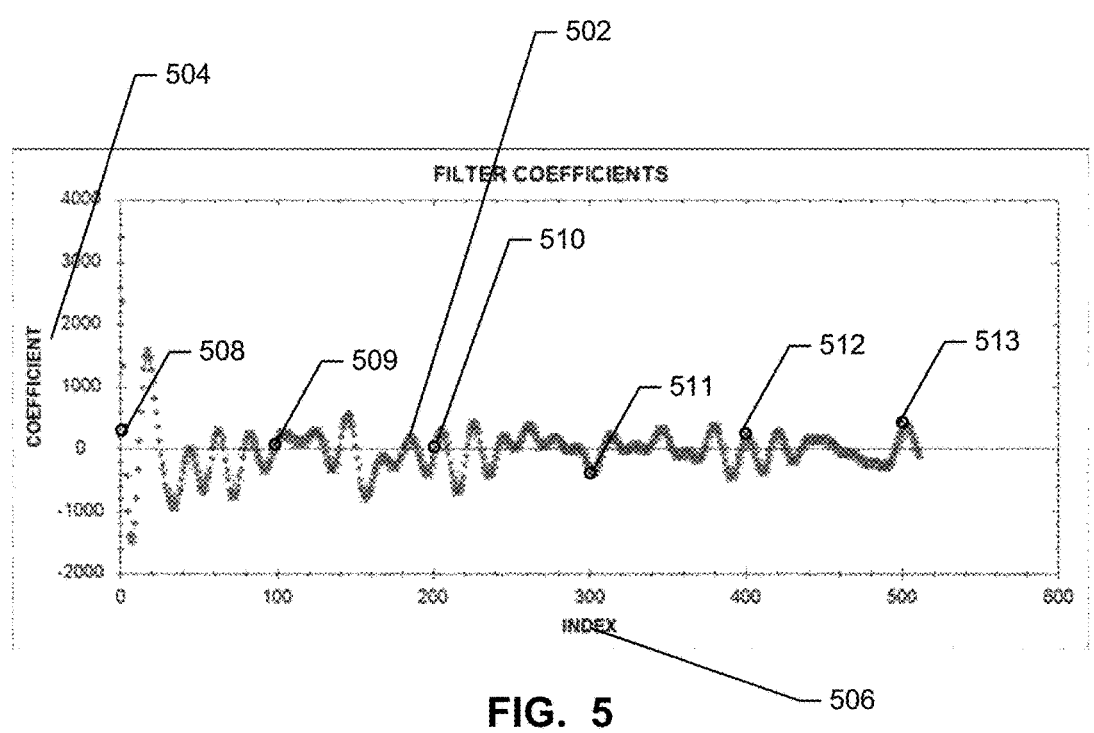
FIG. 5 depicts another example filter weight distribution corresponding to filter weights that indicate a monitored media presentation device is turned off.

In some examples, when the media presentation device 120 is turned off, there may be other sources of audio in the room 110, such as audience members 140, 142 talking to each other. In such examples, the weight adjuster 304 generates a new or updated set of coefficients $\{W_{m2}, m=0, 1, \ldots M-1\}$ for the audio 144, 146. FIG. 5 shows filter coefficients generated by the weight adjuster 304 corresponding to filter weights that indicate that measured audio does not match characteristics of audio emitted by the monitored presentation device, and, therefore, the monitored media presentation device is turned down or off in such an example.

As shown in the example of FIG. 5, an example filter weight distribution 502 includes a plot of a plurality of filter weight coefficients 504 along an index 506, such as time (e.g., milliseconds), sample, etc. Individual weights 508-513 along the distribution form the set of filter coefficients used as a feature vector to represent the audio and calculate similarity between the audio signal and a reference vector.

Based on the filter weight coefficients from the weight adjuster 304 and signal comparison by the audio comparator 306, the state determiner 308 determines whether or not the monitored media presentation device 120 is 1) turned on or 2) turned off, down, or muted such that no audio signal 126 can be detected by the microphones 132, 134.

Figure 6:
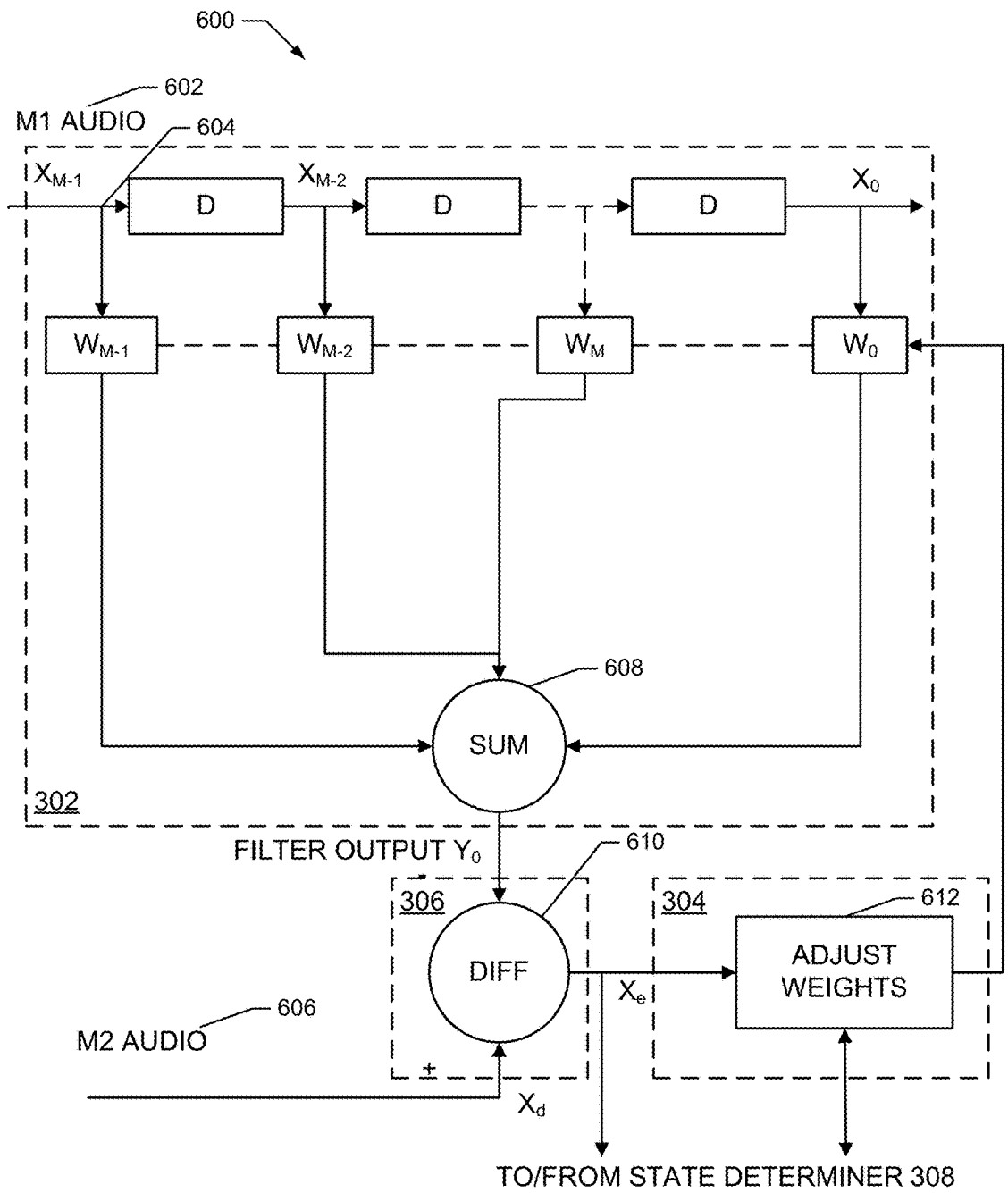
FIG. 6 depicts an example filter apparatus implementing an adaptive least mean square algorithm using a finite impulse response (FIR) filter, such as in the example source detector of FIG. 3.

FIG. 6 shows an example filter apparatus 600 which can be included, for example, in the source detector 136 of the metering device 130 (e.g., illustrated in FIGS. 1-3) to help identify a source of audio detected by the microphones 132, 134 of the metering device 130. As shown in the example of FIG. 6, the example filter apparatus 600 can be used to implement all or part of the adaptive audio filter 302, weight adjuster 304, and audio comparator 306. The example filter apparatus 600 shown in FIG. 6 implements an adaptive echo cancellation algorithm and is configured to subtract a filtered version of detected audio recorded by the first microphone 132 from the detected audio recorded by the second microphone 134. In some examples, the microphones 132, 134 may also have picked up other ambient audio, including the human speech 144, 146.

As disclosed in more detail below, the adaptive filter 600 (e.g., an adaptive Finite Impulse Response (FIR) filter, etc.) generates filter coefficients or taps which, upon analysis, yield information about a similarity between the audio signals detected by the microphones 132, 134. Depending on a location of the source, the audio received by the microphone 134 may be delayed relative to the audio received by the microphone 132, or vice versa. In some examples, multiple sound wave paths exist due to reflections from walls and other objects in the room. Therefore, in order to subtract the effect of the audio detected by the first microphone 132 from the audio detected by second microphone 134, a FIR filter is used to delay and/or attenuate the audio detected by the first microphone 132, for example.

In the example illustrated in FIG. 6, audio samples 602 received by the microphone 132 are passed through a delay line 604, which includes a set of M shift registers D. In the illustrated example, $X_{M-1}$ is a most recent sample, and $X_0$ is an oldest sample. An output $Y_0$ of the filter is shown in Equation 1 below:

$$Y_0 = \sum_{m=0}^{m=M-1} W_m X_m. \quad \text{Equation 1}$$

In Equation 1 above, $\{W_n, m=0, 1, \ldots M-1\}$ are weights whose initial values are set to 0. The set of weights may define a feature or reference vector. A current unfiltered input sample of audio 606 from the second microphone 134 is $X_d$. In the illustrated example of FIG. 6, by summing 608 the weighted audio samples $X_{M-1}$ to $X_0$ as shifted using shift registers D, the filter apparatus 600 operates to make the output $Y_0$ of the filter from the audio sample 602 of microphone 132 approximate the current input sample $X_d$ from microphone 134 (e.g., $Y_0 \approx X_d$).

To verify the approximation, a difference 610 is obtained in comparing the filter output $Y_0$ to $X_d$ to generate a difference signal $X_e$ indicative of an error in the approximation. For example, if $Y_0 \approx X_d$, then $X_e$ should be at or near 0. However, if $Y_0 \neq X_d$, then $X_e$ will be greater than 0. To help ensure that the approximation of $Y_0$ to $X_d$ holds true, the weights $W_{M-1}, W_{M-2}, W_M, \ldots, W_0$, are adjusted 612 to new values based on an error signal $X_e$ generated, for example, as shown in Equations 2 and 3 below:

$$X_e(n) = X_d(n) - Y_O(n) \quad \text{Equation 2;}$$

$$W_m(n+1) = W_m(n) + \mu X_e X_m(n) \quad \text{Equation 3.}$$

In Equations 2 and 3 above, an index n is an iteration index denoting a time, indicated in sample counts, at which the modification in weights is made, and μ is a learning factor that is usually set to a low value (e.g., 0.05, etc.) in the illustrated example. This learning factor gradually minimizes a least mean squared (LMS) error in the output comparison as the filter output converges over the n iterations.

In certain examples, to determine a state (e.g., turned on or turned off) of the media presentation device 120, the example state determiner 308 calculates a dot product between a reference vector of filter coefficients and a comparison vector of filter coefficients $\{W_{m1}, W_{m2}\}$ and compares the result (e.g., referred to as a similarity value, comparison value, etc.) to a threshold (e.g., 0.5, etc.):

$$A \cdot B = \sum_{m=0}^{m=M-1} A_m B_m = A_0 B_0 + A_1 B_1 + \ldots A_{M-1} B_{M-1}. \quad \text{Equation 4}$$

The dot product (e.g., shown in Equation 4 between corresponding M coefficients of vectors A and B) or other similar mathematical comparison between a) a known reference set of coefficients indicative of audio characteristics from an audio source (e.g., the media presentation device 120) at a particular location in the room 110 and b) a second set of coefficients indicative of audio characteristics from a captured audio signal determines whether or not the captured audio originated from the same source as the reference audio (e.g., whether the audio signal 126 came from the media presentation device 120 or was instead generated by another source such as people 140, 142 in the room 110, etc.). If the analysis determines that the audio signal 126 originated from the media presentation device 120, then it can be inferred that the media presentation device 120 is turned on. Otherwise, it can be inferred that the media presentation device 120 is turned off or muted or turned down such that audio is not detectable from the media presentation device 120 by the microphones 132, 134. Audio that does not emanate from the media presentation device 120 is not metered, for example.

In the illustrated example, the threshold for dot product comparison may be specified (e.g., by a user, by a programmer, based on feedback from another application, etc.) to achieve a desired level of accuracy in identifying whether the media presentation device 120 is "ON" or "OFF". If the result of the dot product satisfies (e.g., is greater than) the threshold, the example state determiner 308 determines that the media presentation device 120 is ON. For example, if the media presentation device 120 is ON, the result of the dot product may be close to 1.0 (e.g., assuming that the meter 130 has not been moved since the baseline coefficients were last calculated). If the result of the dot product does not satisfy (e.g., is less than) the threshold, the example state determiner 308 determines that the media presentation device 120 is OFF.

In certain examples, the dot product is calculated by converting each set of filter coefficients to a unit vector. Thus, the set of filter coefficients can be normalized for comparison between a comparison vector of measured filter coefficients and a reference vector of known filter coefficients. The unit vector or "normalized vector" represents a spatial direction in n-dimensional space. Then, the dot product is calculated using the unit vectors to determine an output in a range between negative one and positive one (−1.0 to +1.0). This output can be used to identify or otherwise characterize a source of the audio signal 126 and, extension, determine whether the monitored media presentation device 120 is outputting detectable audio (e.g., is turned on) or is not outputting detectable audio (e.g., is turned off or has its volume turned down or muted such that the media presentation device 120 is not outputting audio detectable by the meter 130).

The dot product or "scalar product" of two unit vectors in n-dimensional space is a scalar value calculated from a sum of the products of the corresponding n elements in each of the two unit vectors. If the two unit vectors are distinct unit vectors (e.g., orthogonal in n-dimensional space), then their dot product is zero. However, if the two unit vectors are identical, then their dot product is one. Therefore, two unit vectors that are different will have almost no dot product (e.g., close to 0), while two unit vectors that are the same or similar will have a dot product close to +1.0.

For example, suppose a reference vector obtained when the media presentation device 120 is confirmed "on", such as the example set of filter coefficients from the example of FIG. 4, is represented as reference vector R={900, 100, −300, 0, 0, 0}. A first comparison filter coefficient vector C1={910, 120, −310, 0, 0, 0}. A second comparison filter coefficient vector, modeled after the example filter coefficients in the example of FIG. 5, C2={100, 0, 0, −200, 100, 200}.

In certain examples, coefficient vectors are normalized or converted to unit vectors as follows: u=v/|v|, where u represents the unit vector, v represents the original vector, and |v| represents a magnitude of the vector v. For the first comparison vector C1, its unit vector can be determined as follows (values truncated for purposes of the illustrative example):

$$|C1| = \sqrt{(910)^2 + (120)^2 + (-310)^2 + 0 + 0 + 0} = 968.81,$$

and

Unit vector $CU1 = \{910/968.81, 120/968.81, -310/968.81, 0, 0, 0\}.$

For the second comparison vector C2, its unit vector can be determined as follows:

$$|C2| = \sqrt{(100)^2 + 0 + 0 + (-200)^2 + (100)^2 + (200)^2} = 316.23,$$

and

Unit vector $CU2 =$ $$\{100/316.23, 0, 0, -200/316.23, 100/316.23, 200/316.23\}.$$

For the reference vector R, its unit vector can be determined as follows:

$$|R| = \sqrt{(900)^2 + (100)^2 + (-300)^2 + 0 + 0 + 0} = 953.54,$$

and

Unit vector $RU = \{900/953.94, 100/953.94, -300/953.94, 0, 0, 0\}.$

Using the above example values and Equation 4, a dot product of RU and CU1 can be computed as follows:

$$RU \cdot CU1 = (910/968.81 * 900/953.94) + (120/968.81 * 100/953.94) + (-310/968.81 * -300/953.94) + 0 + 0 + 0 = 0.999798.$$

Comparing the dot product result to the example threshold of 0.5 shows that the dot product of RU and CU1 is greater than the threshold of 0.5 and close to 1.0. As described above, such a result indicates that the audio signal 126 is emanating from the media presentation device 120, and, therefore, the media presentation device 120 is inferred to be turned on.

Similarly, a dot product of coefficient unit vector CU2 and reference unit vector RU can be determined as follows:

$$RU \cdot CU2 =$$
$$(100/316.23 * 900/953.94) + (0 * 100/953.94) + (0 * -300/953.94) +$$
$$(-200/316.23 * 0) + (100/316.23 * 0) + (200/316.23 * 0) = 0.30.$$

Comparing the dot product result to the example threshold of 0.5 shows that the dot product of RU and CU2 is less than the threshold of 0.5 and close to 0. As described above, such a result indicates that the audio signal 126 is not emanating from the media presentation device 120, and, therefore, the media presentation device 120 is inferred to be turned off, turned down, or muted so as to not be detectable by the microphones 132, 134.

In the illustrated example, the weight adjuster 304 generates a new set of baseline filter coefficients $W_{m1}$ periodically and/or occasionally (e.g., every thirty seconds, every thirty minutes, upon receiving feedback from the decoder 138, creditor 139, and/or AME 160 for bad or otherwise inaccurate result, etc.). For example, the weight adjuster 304 can generate a new reference vector of filter coefficients periodically, in response to a certain number or time period of "off" determinations, in response to a confirmed watermark extraction, etc. For example, the weight adjuster 304 can periodically recalibrate by calculating the reference vector of filter coefficients when a watermark analysis confirms that the media presentation device 120 is turned "on" and emitting valid audio data. The baseline or reference coefficients $W_{m1}$ may be stored for use by the adaptive audio filter 302, the audio comparator 306, and the state determiner 308 in subsequent audio signal analysis and dot product computation, for example.

Figure 7:
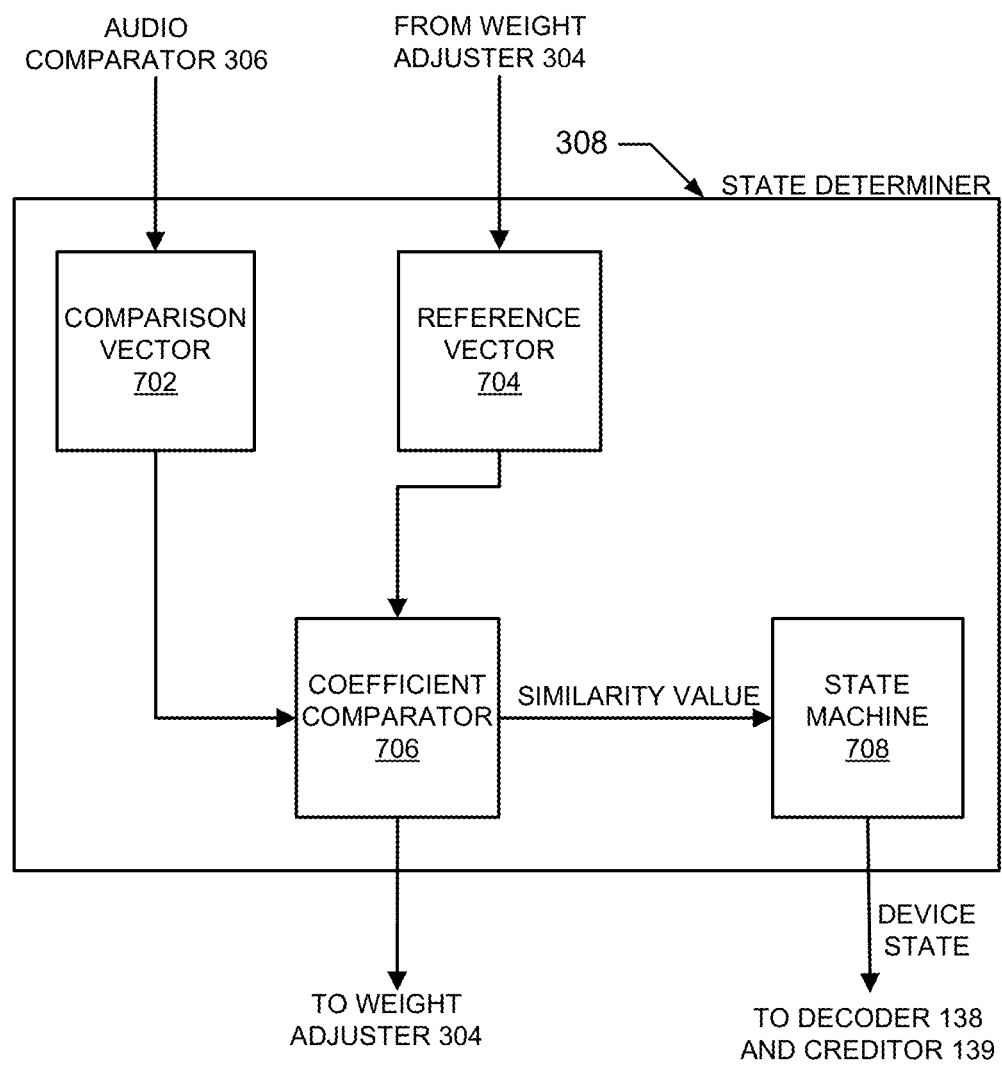
FIG. 7 depicts an example implementation of a state determiner such as the state determiner of FIG. 3.

FIG. 7 shows an example implementation of the state determiner 308 shown and described above with respect to the example of FIG. 3. As shown in the example of FIG. 7, the example state determiner 308 includes a comparison vector 702, a reference vector 704, a coefficient comparator 706, and a state machine 708 to receive filter weight coefficients from the audio comparator 306, determine a status or operating state of the monitored media presentation device 120, and output the determined device state to the decoder 138 and/or creditor 139, as described above with respect to FIGS. 1-3.

As described above, after the inputs from microphones 132 and 134 have been compared to reconcile the audio and generate the set of filter coefficients, the example audio comparator 306 provides a comparison set of filter coefficients to the example state determiner 308. The set of coefficients forms the comparison vector 702 (e.g., converted to a unit vector as described above). The state determiner 308 receives a baseline or reference set of vector coefficients (e.g., from a known or confirmed "on" state of the media presentation device) from the weight adjuster 304 and/or otherwise stores reference coefficients as the reference vector 704 (e.g., converted to a unit vector as described above). The coefficient comparator 706 compares the comparison vector 702 to the reference vector 704 to determine if the filter weight characteristics of the currently captured audio are similar to the reference characteristics of the "known" media presentation device 120 audio. For example, a dot product of the comparison vector 702 and the reference vector 704 yields a value indicative of the similarity or dissimilarity between the comparison vector 702 and the reference vector 704 (and, thereby, the current audio signal 126 and the previously evaluated reference audio signal).

Based on the similarity value determined by the coefficient comparator 706, the state machine 708 infers and/or otherwise determines a state or status of the monitored media presentation device 120. For example, if the similarity value indicates that the comparison vector 702 and the reference vector 704 are identical or similar (e.g., a dot product of the vectors 702, 704 is greater than a threshold (0.5, for example), such as near 1.0), then the state machine 708 indicates or infers that the monitored media presentation device 120 is turned on and is the source of the detected audio signal 126. However, if the similarity value indicates that the comparison vector 702 and the reference vector 704 are not similar (e.g., a dot product of the vectors 702, 704 is less than the threshold, such as near 0), then the state machine 708 indicates or infers that the monitored media presentation device 120 is turned off or is otherwise not outputting detectable audio (e.g., is muted, the volume is turned down past a detectable threshold, etc.). Thus, a source of the audio detected by the microphones 132, 134 is other than the media presentation device 120. The state of the media presentation device 120 provided by the state machine 708 (e.g., on, off, etc.) is sent to the decoder 138 and/or creditor 139 to further process or not process the detected audio (e.g., to process the audio signal 126 from the media presentation device 120 to extract a watermark, calculate a signature, and/or otherwise determine media exposure data, for example).

While an example manner of implementing the source detector 136 and filter apparatus 600 are illustrated in FIGS. 1-3 and 6-7, one or more of the elements, processes and/or devices illustrated in FIGS. 1-3 and 6-7 may be combined, divided, re-arranged, omitted, eliminated and/or implemented in any other way. Further, the example adaptive audio filter 302, the example weight adjuster 304, the example audio comparator 306, the example state determiner 308, and/or, more generally, the example source detector 136 and/or example filter apparatus 600 of FIGS. 1, 2, 3, and 6-7 may be implemented by hardware, software, firmware and/or any combination of hardware, software and/or firmware. Thus, for example, any of the example adaptive audio filter 302, the example weight adjuster 304, the example audio comparator 306, the example state determiner 308, and/or, more generally, the example source detector 136 and/or the filter apparatus 600 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example adaptive audio filter 302, the example weight adjuster 304, the example audio comparator 306, the example state determiner 308, and the example filer apparatus 600 is/are hereby expressly defined to include a tangible computer readable storage device or storage disk such as a memory, a digital versatile disk (DVD), a compact disk (CD), a Blu-ray disk, etc. storing the software and/or firmware. Further still, the example source detector 136 and filter apparatus 600 of FIGS. 1, 2, 3, 6, and 7 may include one or more elements, processes and/or devices in addition to, or instead of, those illustrated in FIGS. 1-3 and 6-7, and/or may include more than one of any or all of the illustrated elements, processes and devices.

Example Monitoring and Determination Methods

Figure 8:
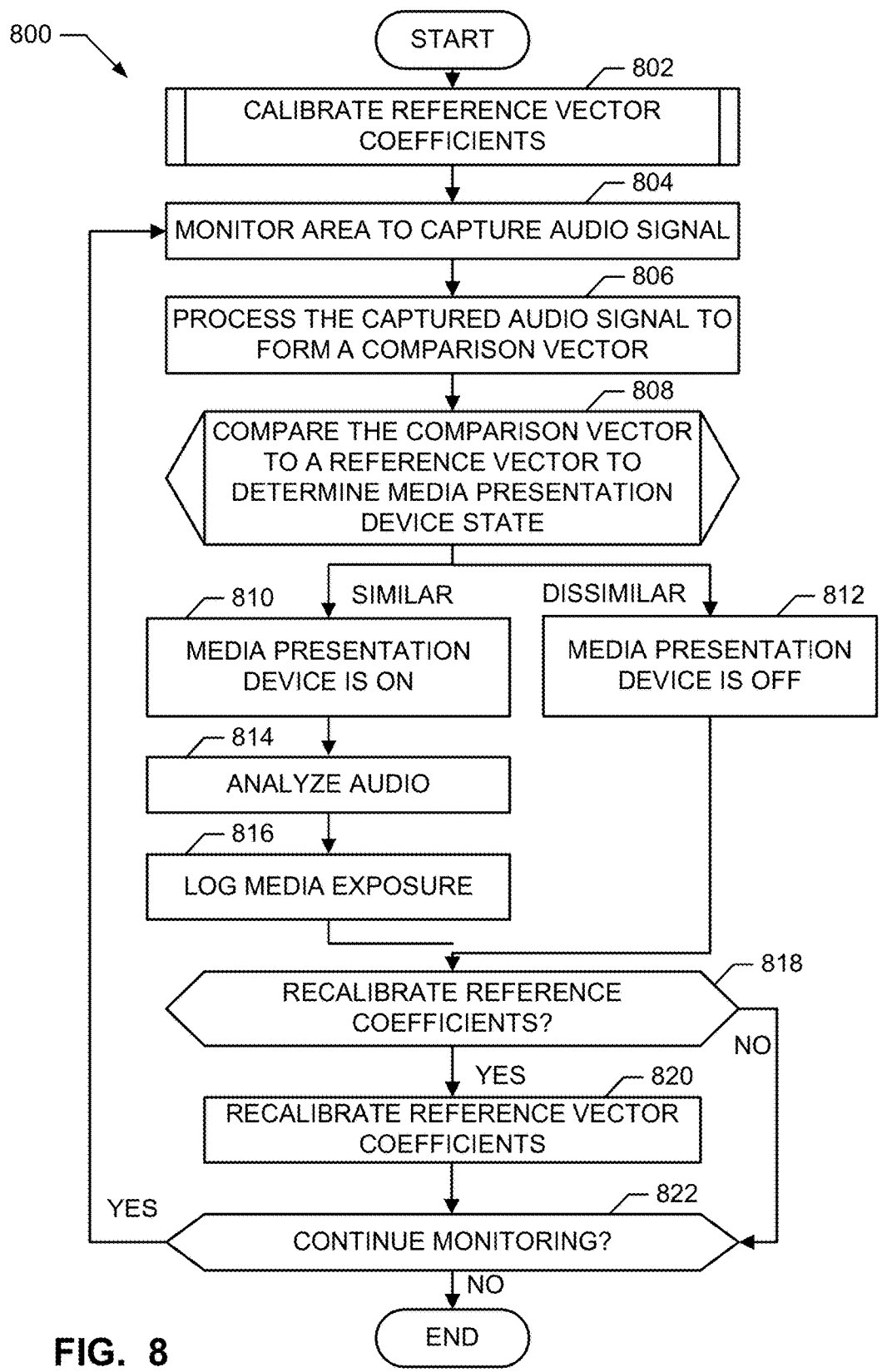
FIG. 8 is a flow diagram representative of example machine readable instructions that may be executed to implement a monitoring and audience measurement process including an example metering device and its source detector of FIGS. 1-3 and 6-7.
Figure 9:
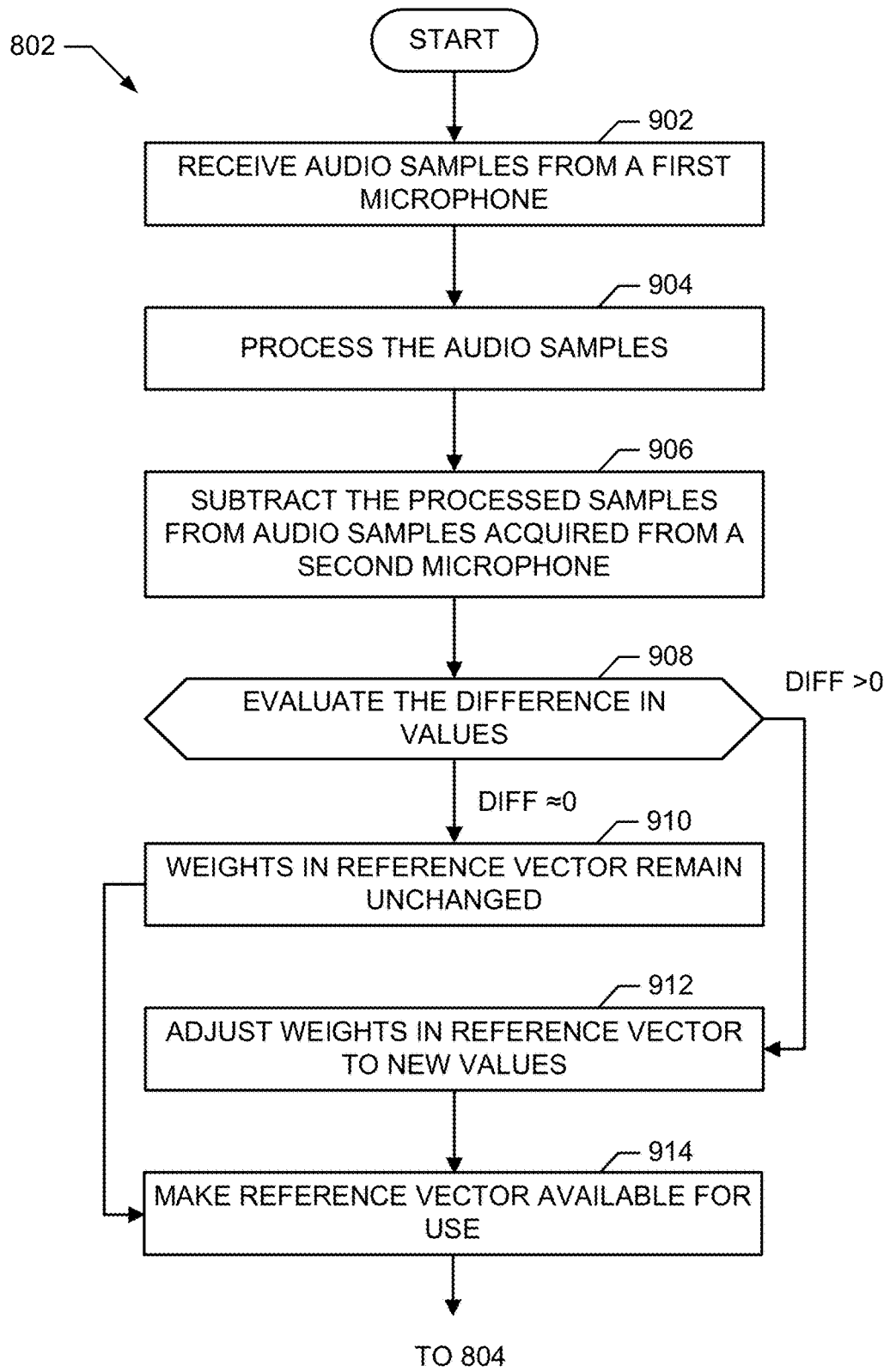
FIG. 9 is a flow diagram providing additional detail representative of example machine readable instructions that may be executed to implement a portion of the flow diagram of FIG. 8.
Figure 10:
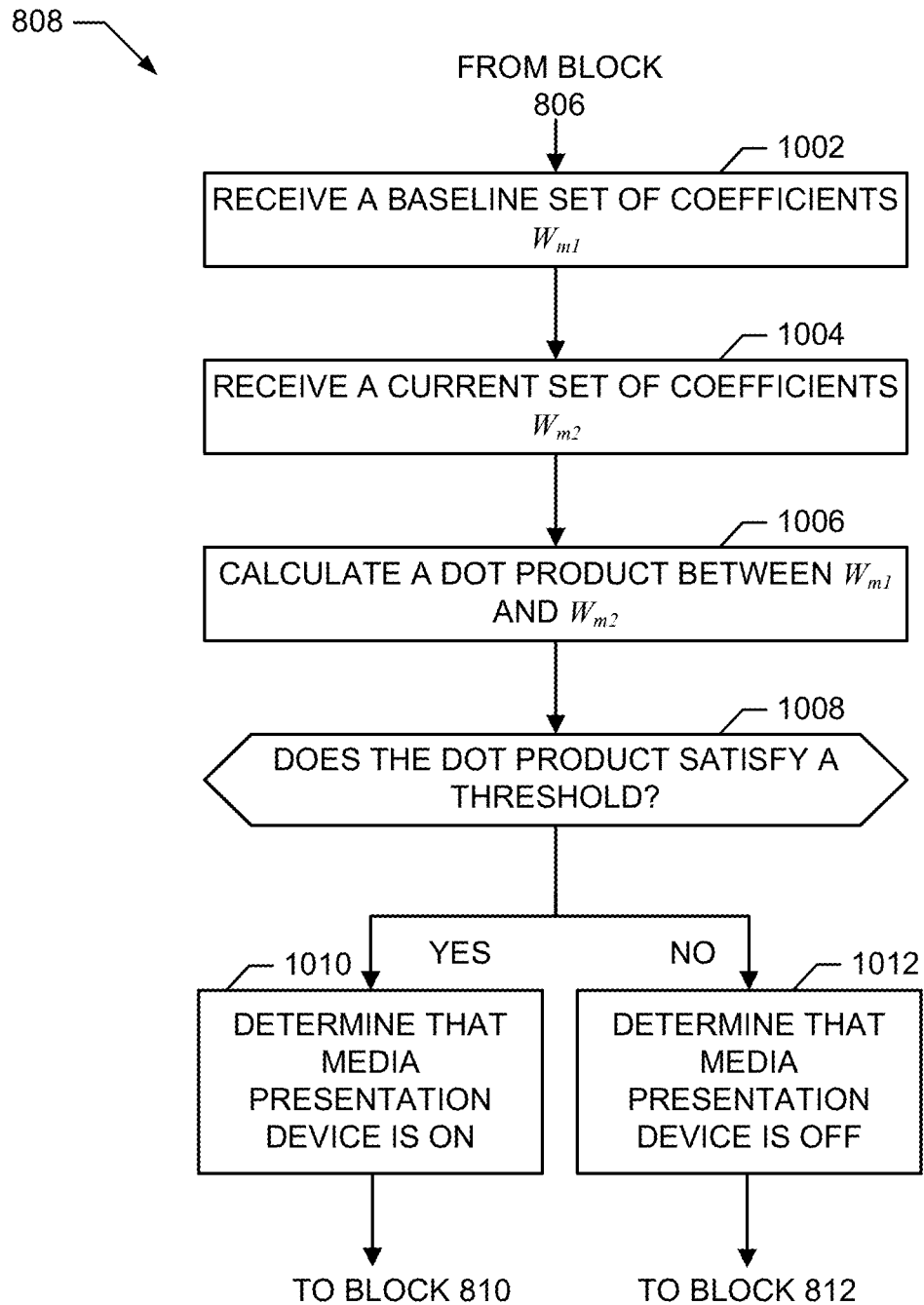
FIG. 10 is a flow diagram providing additional detail representative of example machine readable instructions that may be executed to implement a portion of the flow diagram of FIG. 8.

Flowcharts representative of example machine readable instructions for implementing the example source detector 136 and filter apparatus 600 of FIGS. 1-3 and 6-7 are shown in FIGS. 8-10. In this example, the machine readable instructions comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 8-10, many other methods of implementing the example source detector 136 and filter apparatus 600 of FIGS. 1-3 and 6-7 may alternatively be used. For example, the order of execution of the blocks may be changed, and/or some of the blocks described may be changed, eliminated, or combined.

As mentioned above, the example processes of FIGS. 8-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 8 is a flow diagram representative of example machine readable instructions 800 that may be executed to implement a monitoring and audience measurement process including the example metering device 130 of FIG. 1 and its components (see, e.g., FIGS. 1, 2, 3, and 6-7). At block 802, a reference vector of filter coefficients is determined as part of a calibration of the source detector 136 for audio monitoring in the room 110. For example, the echo cancellation algorithm of Equations 1-3 and the adaptive filter apparatus 600 are applied by the example adaptive audio filter 302 (FIG. 3) to known audio captured from each of the plurality of microphones 132, 134. As disclosed above with respect to FIGS. 1-7, a baseline or reference vector (e.g., such as the reference vector 704 of the example of FIG. 7) of filter coefficients is generated by the source detector 136 (e.g., the example weight adjuster 304 of the example of FIG. 3) for use in determining an identity and/or location of an audio source (e.g., the media presentation device 120, audience member 140, and/or audience member 142).

At block 804, the example metering device 130 (FIG. 1) monitors the room 110 to detect and capture audio via multiple microphones 132 and 134. For example, microphones 132, 134 in the example meter 130 operate to capture audio 126, 144, and/or 146 audible within range of the microphones 132, 134 in the room 110.

In some examples, before advancing to block 806, captured audio is analyzed to identify a watermark in the captured audio signal. If a watermark is found, then, the watermark information can be used to identify media content associated with the audio (e.g., at block 814 below). In some examples, a reliability score associated with the watermark can also be evaluated to determine whether the watermark is reliable enough for use in media identification. For example, if a watermark is detected from audio emanating from another device in an adjacent room (e.g., a device other than the monitored media presentation device 120), then the distance (and its associated noise affect) from the metering device 130 and its microphones 132, 134 can result in an inadvertently detected watermark with a low reliability score.

Alternatively or in addition to the reliability score, a volume level of the captured audio signal can be analyzed to determine whether the watermark has been detected in an audio signal near the metering device 130 or far from the metering device 130 (e.g., is originating from the monitored media presentation device 120 near the metering device 130 or is originating from another device away from the metering device 130).

In such examples, upon determination of a low score, low volume, etc., associated with a detected watermark, further analysis of the audio signal can then proceed to block 806 as described below. Additionally, if no watermark is identified in the captured audio, then analysis moves to block 806 below.

At block 806, the example source detector 136 (FIG. 1) (and its adaptive audio filter 302, weight adjuster 304, and audio comparator 306 (FIG. 3)) processes the captured audio signal to generate a comparison vector (e.g., such as the comparison vector 702 of the example of FIG. 7). For example, the echo cancellation algorithm of Equations 1-3 and the adaptive filter apparatus 600 are applied to the audio captured from each of the plurality of microphones 132, 134. As disclosed above with respect to FIGS. 1-7, a vector of filter coefficients is generated by the source detector 136 for comparison against the reference vector to determine whether or not the captured audio is generated by the media presentation device 120 and/or by another ambient source such as the audience members 140, 142.

At block 808, the example source detector 136 (FIG. 1) (and its audio comparator 306 (FIG. 3)) compares the comparison vector for the captured audio signal to the reference vector to generate a similarity value. For example, a dot product is computed between the comparison vector coefficients and the reference vector coefficients to determine a similarity or difference between the vectors. Such a similarity or difference in the audio filter coefficients is indicative of a location of origin for the audio signal, allowing the example source detector 136 to determine whether a likely source for the audio signal 126 is or is not the media presentation device 120, for example.

If the captured audio is determined to be emanating from the "known" location of the media presentation device 120, then the dot product comparison yields a value of approximately 1.0, indicating a similarity between the vectors. At block 810, such a result processed by the example state determiner 308 indicates that the media presentation device 120 is turned "on" and the audio matches the characteristics of sound coming from the media presentation device 120 (e.g., audio 126 from the television).

If the captured audio is determined to be ambient audio (e.g., emanating from an audience member 140, 142 and/or other unidentified source such as a device in an adjacent room, etc.), then the dot product comparison yields a value of well below 0.5, indicating that the vectors are dissimilar. At block 812, such a result processed by the example state determiner 308 indicates that the media presentation device 120 is turned "off" (or has been muted or has the volume set too low to be detectable by the microphones, etc.). In some examples, if the media presentation device 120 is determined to be "off", then the creditor 139 of the example metering device 130 discards, ignores, and/or marks as invalid the captured audio signal and associated information (e.g., timestamp, erroneous code, etc.).

At block 814, if the media presentation device 120 is determined to be on, then the example metering device 130 analyzes the captured audio. For example, the metering device 130 extracts a watermark from the captured audio signal. Alternatively or in addition, the example metering device 130 can process the audio signal to determine a signature for further analysis, for example. For example, the example decoder 138 decodes the captured audio signal to identify a watermark embedded in the audio signal and/or process the captured audio signal to compute a signature associated with the signal in the absence of a watermark. Identification of the watermark and processing of a signature from the captured audio signal may occur in conjunction with the AME 160 as well as with the decoder 138 and creditor 139 of the example meter 130, for example.

At block 816, media exposure information is logged based on the signal analysis (e.g., based on the identified watermark and/or computed signature information). For example, based on the identification of the extracted watermark, the example creditor 139 captures an identification of the media exposure based on the decoded watermark. The creditor 139 may also assign a location identifier, timestamp, etc., to the decoded data. The creditor 139 may transmit and/or otherwise work in conjunction with the AME 160 via the network 150, for example.

At block 818, results of the comparison of vectors at block 708 are evaluated to determine whether reference vector coefficients should be recalibrated. For example, changed conditions in the room 110 (e.g., additional audience members 140, 142, moved furniture, repositioning of the media presentation device 120, etc.) can affect the coefficients indicating the location of the media presentation device 120 and the distinction between the media presentation device 120 and other ambient audio sources (e.g., audience member 140, 142, etc.). In some examples, the example state determiner 308 may determine whether or not to trigger a recalibration of the reference vector based on the available information.

Alternatively or in addition to evaluating the vector comparison, recalibration of the reference coefficients can be triggered based on confirmation of a valid watermark in the captured audio signal. For example, as described above, identification of a watermark in a captured audio signal and computation of a score associated with the watermark to determine its reliability can validate that the media presentation device 120 is turned on and is outputting an audio signal 126 indicative of media content exposed to the room 110. Thus, the operating state of the monitored media presentation device 120 and the validity of its audio output can be automatically determined and used to periodically verify or recalculate the reference vector of filter weight coefficients. Such automated recalibration can be conducted continuously, after passage of a certain period of time, triggered based on a consecutive number of dissimilar results, etc.

At block 820, if recalibration is triggered (e.g., based on the results of the comparison, based on an accurate extraction and identification of watermark data, triggered upon request, etc.), then weighted filter coefficients for the reference vector are re-calculated using an adaptive echo cancellation algorithm such as the filter algorithm of Equations 1-3 and the adaptive filter apparatus 600 of FIG. 6, which is applied to an updated known audio sample (e.g., program audio generated when the media presentation device 120 is known to be turned on) captured from each of the plurality of microphones 132, 134.

At block 822, state information is evaluated by the state determiner 308 to determine whether monitoring is to continue. For example, state information for the metering device 130 and/or instructions from the AME 160 are evaluated by the example state determiner 308 to determine whether to continue monitoring for audio from the media presentation device 120 in the room 110. If the example state determiner 308 determines that monitoring is to continue, then control returns to block 804 to monitor for a new audio signal. Otherwise, if the example state determiner 308 determines that monitoring is not to continue, then the example process 800 ends.

FIG. 9 is a flow diagram representative of example machine readable instructions that may be executed to implement the example filter apparatus 600 of FIG. 6 and block 802 of the example process 800 of FIG. 8 to process incoming audio to calculate filter taps or coefficients for comparison to determine a state of the media presentation device 120 (FIG. 1). While the example process of FIG. 9 as shown provides additional detail regarding execution of block 802 of the example process 800 of FIG. 8 to provide a reference vector, the example process of FIG. 9 can also be applied to generate a comparison vector (block 806) of comparison filter weight coefficients and/or to recalibrate reference vector coefficients (block 820) for audio signal analysis, for example.

At block 902, audio samples are received. For example, audio samples 602 are received by the example microphone 132. At block 904, the received audio samples are processed.

For example, audio samples 602 received by the microphone 132 are passed through a delay line 604 such that M samples are shifted by a delay D. In the illustrated example, $X_{M-1}$ is a most recent sample, and $X_0$ is an oldest sample. An output $Y_0$ is summed from $X_m$ samples as weighted by a reference set of coefficients $\{W_m, m=0, 1, \ldots M-1\}$ using Equation 1 applied to the filter apparatus 600.

At block 906, the processed audio samples from the first microphone are compared to audio samples acquired from a second microphone. For example, the output $Y_0$ is subtracted from audio sample(s) $X_d$ 606 received by the example microphone 134. Thus, if the summed total of the weighted audio samples $X_{M-1}$ to $X_0$ (as shifted using shift registers D) approximately matches the audio sample Xd, a difference between $X_d$ and $Y_0$ is approximately zero.

At block 908, the difference between $X_d$ and $Y_0$ is evaluated to determine whether the difference is approximately zero or is significantly greater than zero. At block 910, if the difference is approximately zero, then weights in the reference vector may remain unchanged. If, however, the difference is greater than a threshold above zero, then, at block 912, weights in the reference vector (e.g., $W_{M-1}$, $W_{M-2}$, $W_M, \ldots, W_0$) are adjusted to new values based on Equations 2 and 3 disclosed above. For example, movement of the media presentation device 120, presence of audience members 140, 142, presence of furniture, etc., in the room 110 may result in a change in sound characteristics that affects the weights in the reference vector and trigger adjustment of reference vector weights.

At block 914, the reference vector is made available for use. For example, if weights were adjusted at block 912, the updated reference vector is made available for use in determining the state (e.g., identity, on/off status, location, etc.) of the media presentation device 120 in the monitored room 110.

FIG. 10 is a flow diagram representative of example machine readable instructions that may be executed to implement the example source detector 136 of FIGS. 1-3 and its components (e.g., the adaptive audio filter of FIG. 6 and the state determiner of FIG. 7) to determine a state of the media presentation device 120 (FIG. 1). The example process of FIG. 10 provides additional and/or related detail regarding execution of block 808 of the example process 800 of FIG. 8.

Initially, at block 1002, a baseline set of weighted coefficients $W_{m1}$ is received. For example, a reference vector, such as example reference vector 704, is received from the example weight adjuster 304 (FIG. 3), which generates the vector based on audio received by the first and second microphones 132, 134 (FIGS. 1-3) at a first time (e.g., using Equations 1-3 as disclosed above in connection with FIG. 6). At block 1004, a current set of weighted coefficients $W_{m2}$ is received. For example, a comparison vector, such as the example comparison vector 702, is received from the weight adjuster 304, which generates the vector based on audio received by the first and second microphones 132, 134, at a second time after the first time.

At block 1006, the example audio comparator 306 calculates a dot product between $W_{m1}$ and $W_{m2}$. For example, as described above with respect to Equation 4 and FIG. 3, vectors $W_{m1}$ and $W_{m2}$ are converted to unit vectors and analyzed according to a dot product and/or other mathematical calculation. At block 1008, the example state determiner 308 determines if the result of the dot product satisfies (e.g., is greater than) a threshold.

If the result of the dot product satisfies the threshold (e.g., is close to 1.0), then, at block 1010, the media presentation device 120 is determined to be "ON". That is, based on the result of the dot product, the example state determiner 308 determines that the media presentation device 120 is ON. Based on the determination that the media presentation device 120 is ON, program control continues to block 810.

Otherwise, if the result of the dot product does not satisfy the threshold (e.g., is close to zero), at block 1012, the media presentation device 120 is determined to be "OFF". That is, based on the result of the dot product, the example state determiner 308 determines that the media presentation device 120 is OFF. Based on the determination that the media presentation device 120 is OFF (or is otherwise not generating detectable audio), program control continues to block 812.

Figure 11:
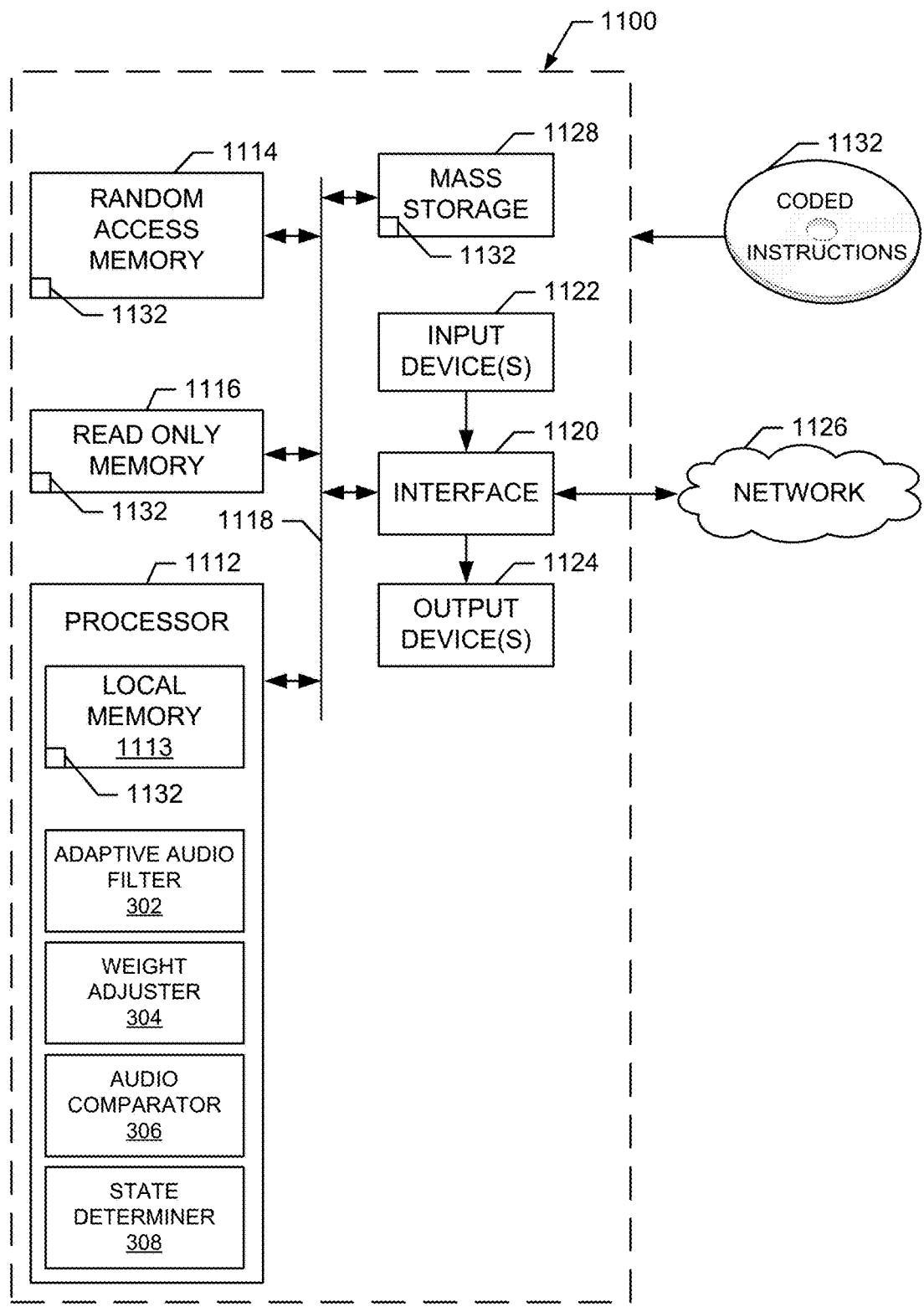
FIG. 11 is a block diagram of an example processor system structured to execute the example machine readable instructions represented by FIGS. 8-10 to implement the example metering device and its source detector of FIGS. 1-3 and 6-7.

FIG. 11 is a block diagram of an example processor platform 1100 capable of executing the instructions of FIGS. 8-10 to implement the example source detector 136 (and its components) of FIGS. 1-3 and 6-7. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In the illustrated example, the processor 1112 is structures to include the example adaptive audio filter 302, the example weight adjuster 304, the example audio comparator 306, and the example state determiner 308 of the example source detector 136.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

Coded instructions 1132 representing the flow diagrams of FIGS. 8-10 may be stored in the mass storage device 1128, in the volatile memory 1114, in the non-volatile memory 1116, and/or on a removable tangible computer readable storage medium such as a CD or DVD.

From the foregoing, it will be appreciated that examples have been disclosed which allow a meter 130 (FIG. 1) to distinguish between measurable content and ambient sound to determine an operating state of a media presentation device and improve accuracy of audience measurement. Because the meter 130 can automatically and autonomously monitor, analyze, and determine operating state and validity of monitored data, additional devices, panelist involve, and external oversight can be avoided, resulting in increased accuracy and robustness as well as convenience.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of determining a state of a media presentation device, the method comprising:
    generating, using an echo cancellation algorithm, a first set of weighted coefficients based on first audio received by first and second microphones at a first time;
    generating, using the echo cancellation algorithm, a second set of weighted coefficients based on second audio received by the first and second microphones at a second time after the first time;
    comparing the first set of weighted coefficients and the second set of weighted coefficients by calculating a dot product between the first set of weighted coefficients and the second set of weighted coefficients to generate a similarity value;
    when the similarity value satisfies a first threshold, determining that the media presentation device is in a first state;
    when the similarity value does not satisfy the first threshold, determining that the media presentation device is in a second state; and
    controlling a metering device based on whether the media presentation device is in the first state or the second state.

2. The method of claim 1, further including:
    when the media presentation device is in the first state, extracting a watermark from the second audio.

3. The method of claim 1, wherein the generating of the first and second sets of weighted coefficients includes applying the echo cancellation algorithm using a finite impulse response filter to generate the first set of weighted coefficients and to generate the second set of weighted coefficients.

4. The method of claim 1, wherein the first state includes an on state, and wherein the second state includes an off state.

5. The method of claim 1, further including:
    applying a third set of weighted coefficients to one or more samples of third audio received by the first microphone to provide a filter output;
    comparing the filter output to a sample of the third audio received by the second microphone to generate an error signal; and
    when the error signal exceeds a second threshold, adjusting the first set of weighted coefficients based on the error signal.

6. The method of claim 5, wherein the error signal, $X_e(n)$, includes $X_e(n)=X_d(n)-Y_O(n)$, wherein $X_d(n)$ represents an audio sample and $Y_O(n)$ represents a summed filter output of multiple audio samples and n is an iteration index, and wherein the first set of weighted coefficients is adjusted based on the error signal by $W_m(n+1)=W_m(n)+\mu X_e X_m(n)$, wherein $W_m(n+1)$ and $W_m$ are weight coefficients, $X_m(n)$ is a weighted audio sample, and $\mu$ is a learning factor.

7. The method of claim 5, wherein the comparing of the filter output to the sample of the third audio received by the second microphone to generate the error signal further includes subtracting the filter output from the sample of the third audio received by the second microphone to generate the error signal.

8. A tangible computer readable storage medium comprising instructions that, when executed, cause a machine to at least:
    generate, using an echo cancellation algorithm, a first set of weighted coefficients based on first audio received by first and second microphones at a first time;
    generate, using the echo cancellation algorithm, a second set of weighted coefficients based on second audio received by the first and second microphones at a second time after the first time;
    compare the first set of weighted coefficients and the second set of weighted coefficients by calculating a dot product between the first set of weighted coefficients and the second set of weighted coefficients to generate a similarity value;
    when the similarity value satisfies a first threshold, determine that a media presentation device is in a first state;
    when the similarity value does not satisfy the first threshold, determine that the media presentation device is in a second state; and
    control a metering device based on whether the media presentation device is in the first state or the second state.

9. The tangible computer readable storage medium of claim 8, further including instructions that, when executed, cause the machine to, when the media presentation device is in the first state, extract a watermark from the second audio.

10. The tangible computer readable storage medium of claim 8, further including instructions that, when executed, cause the machine to generate the first and second sets of weighted coefficients by applying the echo cancellation algorithm using a finite impulse response filter to generate the first set of weighted coefficients and to generate the second set of weighted coefficients.

11. The tangible computer readable storage medium of claim 8, wherein the first state includes an on state, and wherein the second state includes an off state.

12. The tangible computer readable storage medium of claim 8, further including instructions that, when executed, cause the machine to:
apply a third set of weighted coefficients to one or more samples of a third audio received by the first microphone to provide a filter output;
compare the filter output to a sample of the third audio received by the second microphone to generate an error signal; and
when the error signal exceeds a second threshold, adjust the first set of weighted coefficients based on the error signal.

13. The tangible computer readable storage medium of claim 12, wherein the error signal, $X_e(n)$, includes $X_e(n)=X_d(n)-Y_O(n)$, wherein $X_d(n)$ represents an audio sample and $Y_O(n)$ represents a summed filter output of multiple audio samples and n is an iteration index, and wherein the first set of weighted coefficients is adjusted based on the error signal by $W_m(n+1)=W_m(n)+\mu X_e X_m(n)$, wherein $W_m(n+1)$ and $W_m$ are weight coefficients, $X_m(n)$ is a weighted audio sample, and $\mu$ is a learning factor.

14. The tangible computer readable storage medium of claim 12, wherein the instructions, when executed, cause the machine to compare the filter output to the sample of the third audio received by the second microphone to generate the error signal by subtracting the filter output from the sample of the third audio received by the second microphone to generate the error signal.

15. A metering device comprising a processor to implement a source detector including an adaptive audio filter, an audio comparator, and a state determiner,
the adaptive audio filter to at least:
generate, using an echo cancellation algorithm, a first set of weighted coefficients based on first audio received by first and second microphones at a first time; and
generate, using the echo cancellation algorithm, a second set of weighted coefficients based on second audio received by the first and second microphones at a second time after the first time;
the audio comparator to at least:
compare the first set of weighted coefficients and the second set of weighted coefficients by calculating a dot product between the first set of weighted coefficients and the second set of weighted coefficients to generate a similarity value; and
the state determiner to at least:
when the similarity value satisfies a first threshold, determine that the media presentation device is in a first state;
when the similarity value does not satisfy the first threshold, determine that the media presentation device is in a second state; and
control the metering device based on whether the media presentation device is in the first state or the second state.

16. The metering device of claim 15, wherein the metering device is to generate the first and second sets of weighted coefficients by applying the echo cancellation algorithm using a finite impulse response filter to generate the first set of weighted coefficients and to generate the second set of weighted coefficients.

17. The metering device of claim 15, wherein the first state includes an on state, and wherein the second state includes an off state.

18. The metering device of claim 15, wherein the metering device is further to:
apply a third set of weighted coefficients to one or more samples of a third audio received by the first microphone to provide a filter output;
compare the filter output to a sample of the third audio received by the second microphone to generate an error signal; and
when the error signal exceeds a second threshold, adjust the first set of weighted coefficients based on the error signal.

19. The metering device of claim 18, wherein the error signal, $X_e(n)$, includes $X_e(n)=X_d(n)-Y_O(n)$, wherein $X_d(n)$ represents an audio sample and $Y_O(n)$ represents a summed filter output of multiple audio samples and n is an iteration index, and wherein the first set of weighted coefficients is adjusted based on the error signal by $W_m(n+1)=W_m(n)+\mu X_e X_m(n)$, wherein $W_m(n+1)$ and $W_m$ are weight coefficients, $X_m(n)$ is a weighted audio sample, and $\mu$ is a learning factor.

20. The metering device of claim 18, wherein the metering device is to compare the filter output to the sample of the third audio received by the second microphone to generate the error signal by subtracting the filter output from the sample of the third audio received by the second microphone to generate the error signal.

* * * * *